(12) United States Patent
Kurosaki

(10) Patent No.: US 11,345,324 B2
(45) Date of Patent: May 31, 2022

(54) ELECTRIC DRIVE DEVICE FOR VEHICLE

(71) Applicant: TOYOTA JIDOSHA KABUSHIKI KAISHA, Toyota (JP)

(72) Inventor: Shin Kurosaki, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 16/699,182

(22) Filed: Nov. 29, 2019

(65) Prior Publication Data

US 2020/0189543 A1 Jun. 18, 2020

(30) Foreign Application Priority Data

Dec. 12, 2018 (JP) .............................. JP2018-232981

(51) Int. Cl.
*B60T 13/58* (2006.01)
*B60L 7/24* (2006.01)
*B60T 1/087* (2006.01)
*B60K 1/00* (2006.01)

(52) U.S. Cl.
CPC .............. *B60T 13/586* (2013.01); *B60L 7/24* (2013.01); *B60T 1/087* (2013.01); *B60K 2001/001* (2013.01)

(58) Field of Classification Search
CPC ...... B60T 13/585; B60T 13/586; B60T 1/087; B60L 7/24; B60L 7/26; B60K 2001/001
See application file for complete search history.

(56) References Cited

U.S. PATENT DOCUMENTS

| | | | | |
|---|---|---|---|---|
| 7,651,426 | B2 * | 1/2010 | Yokoyama | F16H 48/22 475/19 |
| 8,662,276 | B2 * | 3/2014 | Leiter | F16H 57/0483 192/216 |
| 10,569,647 | B2 * | 2/2020 | Yamamura | B60K 23/0808 |
| 10,814,720 | B2 * | 10/2020 | Wang | F16H 48/10 |
| 2019/0283578 | A1 * | 9/2019 | Wang | B60K 1/00 |
| 2020/0139819 | A1 * | 5/2020 | Kurosaki | B60L 7/26 |

FOREIGN PATENT DOCUMENTS

| | | |
|---|---|---|
| CN | 103522885 A | 1/2014 |
| JP | H07-091535 A | 4/1995 |
| JP | H07-034235 U | 6/1995 |
| JP | 2004-040975 A | 2/2004 |
| JP | 2010-158946 A | 7/2010 |
| JP | 2012-112236 A | 6/2012 |
| JP | 2018-023212 A | 2/2018 |

* cited by examiner

*Primary Examiner* — Thomas W Irvin
(74) *Attorney, Agent, or Firm* — Oliff PLC

(57) ABSTRACT

An electric drive device for a vehicle includes: a rotating machine that is used as a driving force source for traveling of the vehicle; a differential device configured to distribute power transmitted from the rotating machine to right and left driving wheels; and a retarder provided in a power transmission path between the rotating machine and the differential device and configured to generate a braking force. The retarder is either an electromagnetic retarder or a fluid retarder. The rotating machine and the retarder are arranged on opposite sides of an axis of the differential device in a front-rear direction of the vehicle in a plan view seen from above the vehicle, the axis of the differential device being parallel to a width direction of the vehicle.

5 Claims, 12 Drawing Sheets

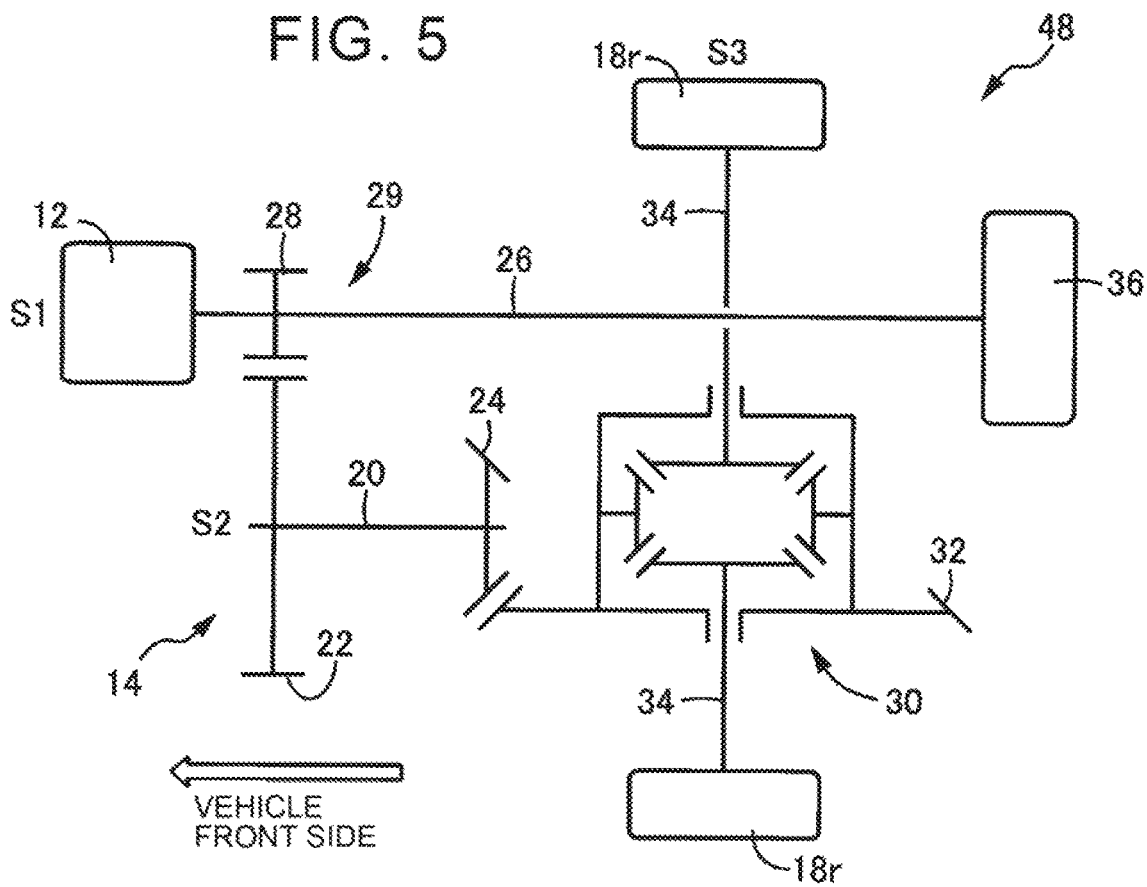
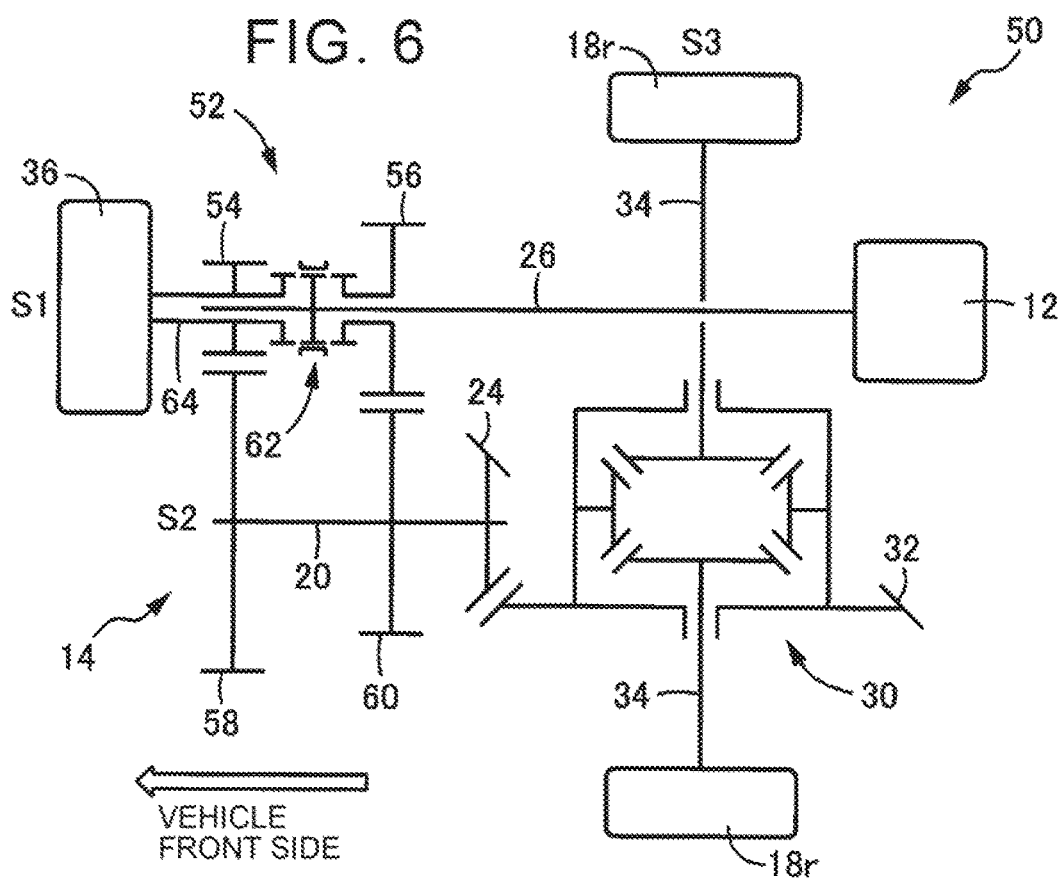

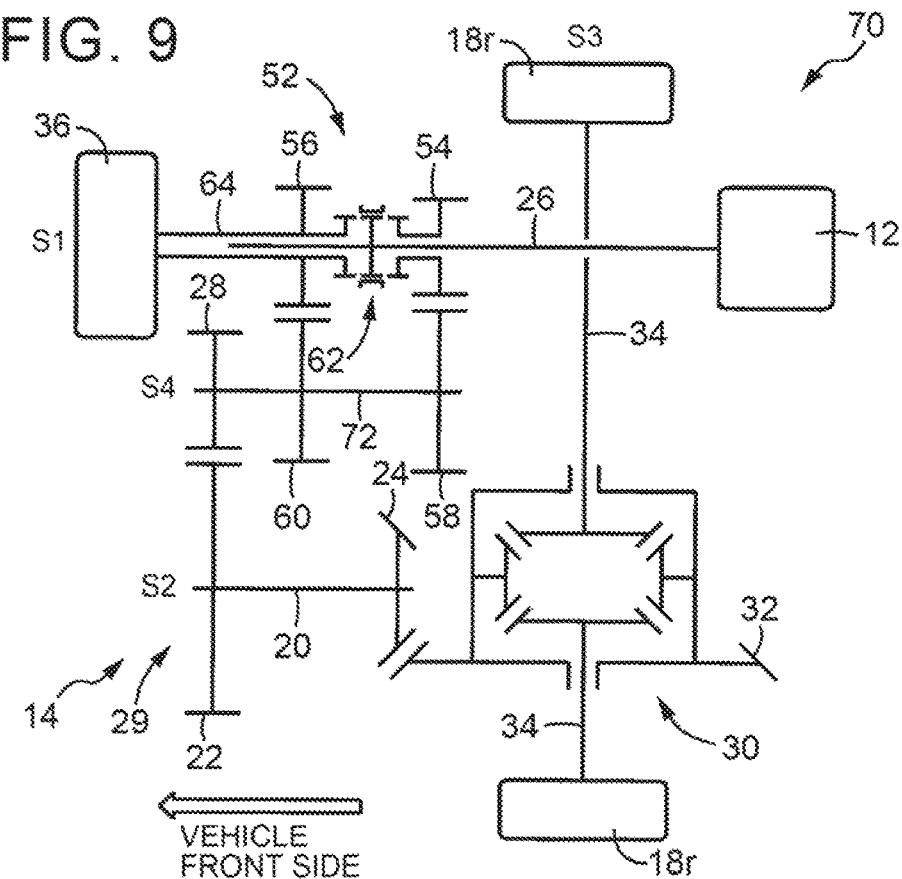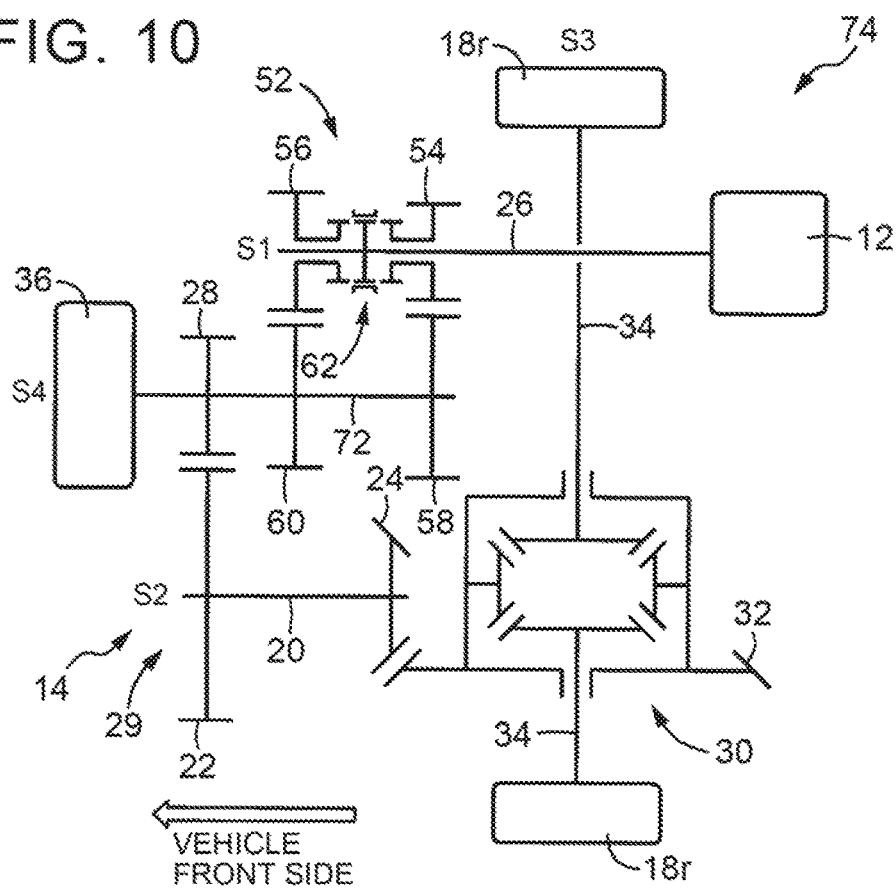

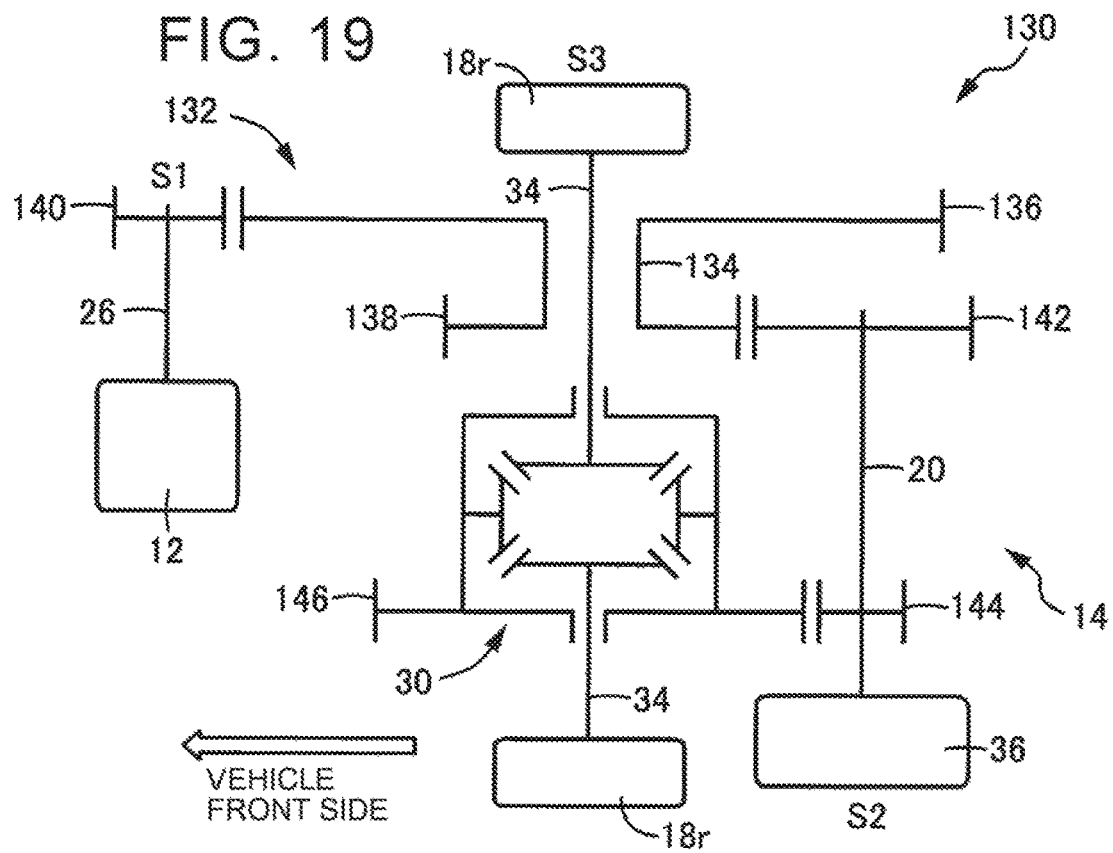
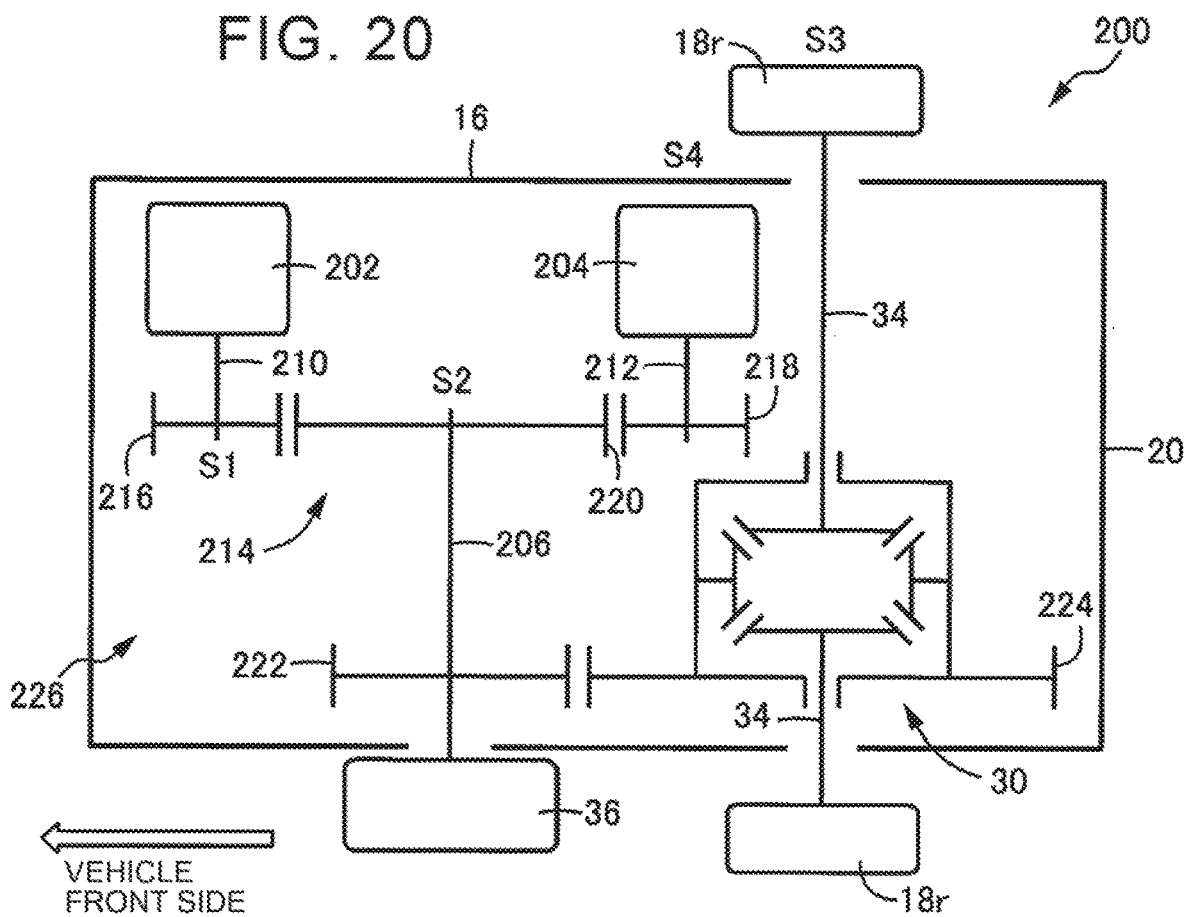

ELECTRIC DRIVE DEVICE FOR VEHICLE

INCORPORATION BY REFERENCE

The disclosure of Japanese Patent Application No. 2018-232981 filed on Dec. 12, 2018 including the specification, drawings and abstract is incorporated herein by reference in its entirety.

BACKGROUND

1. Technical Field

The disclosure relates to an electric drive device for a vehicle, and in particular to an electric drive device for a vehicle, in which a retarder is provided in a power transmission path.

2. Description of Related Art

There is a known electric drive device for a vehicle including a rotating machine used as a driving force source for traveling, a differential device that distributes power transmitted from the rotating machine to right and left driving wheels, and an electromagnetic or fluid retarder that is provided in a power transmission path between the rotating machine and the differential device and generates a braking force (see Japanese Unexamined Patent Application Publication No. 2018-23212 (JP 2018-23212 A)).

SUMMARY

However, such an electric drive device for a vehicle is provided with the retarder on a propeller shaft in consideration of strength, weight balance, etc. Therefore, the electric drive device for a vehicle tends to be large in scale. In addition, when the electric drive device is applied to a passenger car, for example, a protrusion needs to be provided in a floor for the propeller shaft, which may restrict a cabin space, a trunk space, or the like. Thus, there has been room for improvement. The propeller shaft generally includes a universal joint, a spline, and the like, and the device tends to be large in scale.

According to the disclosure, it is possible to eliminate the propeller shaft by a novel arrangement of the retarder.

A first aspect of the disclosure relates to an electric drive device for a vehicle. The electric drive device includes a rotating machine used as a driving force source for traveling of the vehicle, a differential device configured to distribute power transmitted from the rotating machine to right and left driving wheels, and a retarder provided in a power transmission path between the rotating machine and the differential device and configured to generate a braking force. The retarder is either an electromagnetic retarder or a fluid retarder. The rotating machine and the retarder are arranged on opposite sides of an axis of the differential device in a front-rear direction of the vehicle in a plan view seen from above the vehicle. The axis of the differential device is parallel to a width direction of the vehicle. The term "axis" in the present specification has the same meaning as a center line or a rotation center line, and the axis may not necessarily have material substance. Further, the fact that the rotating machine and the retarder are arranged on the opposite sides of the axis of the differential device in the front-rear direction of the vehicle means that their centers of gravity only need to be located on opposite sides of the axis of the differential device in the front-rear direction of the vehicle.

In the above configuration, the rotating machine and the retarder are arranged on the opposite sides of the axis of the differential device in the front-rear direction of the vehicle in the plan view seen from above the vehicle, which improves a weight balance of the electric drive device for a vehicle, between parts forward and rearward of the axis of the differential device. Accordingly, it is possible to eliminate a propeller shaft and to form a compact electric drive device including the rotating machine, the retarder, and the differential device, which is advantageous in terms of space. In other words, if the weight balance is poor, it is necessary to increase strength, rigidity, etc. of various parts, which hinders downsizing.

In the electric drive device according to the first aspect, the rotating machine and the retarder may be arranged such that both an axis of the rotating machine and an axis of the retarder are parallel to the front-rear direction of the vehicle in the plan view.

In the above configuration, since both the rotating machine and the retarder are arranged parallel to the front-rear direction of the vehicle, dimensions of the electric drive device in the width direction of the vehicle can be reduced.

A second aspect of the disclosure relates to an electric drive device for a vehicle. The electric drive device includes a rotating machine used as a driving force source for traveling of the vehicle, a differential device configured to distribute power transmitted from the rotating machine to right and left driving wheels, and a retarder provided in a power transmission path between the rotating machine and the differential device and configured to generate a braking force. The retarder is either an electromagnetic retarder or a fluid retarder. The rotating machine includes a first rotating machine and a second rotating machine arranged on different axes. The power transmission path between the first and second rotating machines and the differential device is provided with a combined power transmission shaft to which power output from the first rotating machine and power output from the second rotating machine are transmitted. The combined power transmission shaft is provided on an axis different from an axis of the first rotating machine and an axis of the second rotating machine. The retarder is provided on the combined power transmission shaft.

In the above configuration, the first rotating machine and the second rotating machine are provided as the rotating machine. The combined power transmission shaft to which the power output from the first rotating machine and the power output from the second rotating machine are transmitted is provided on the axis that is different from the axes of the first rotating machine and the second rotating machine. The retarder is disposed on the combined power transmission shaft. The combined power transmission shaft receives the power transmitted from the first rotating machine and the second rotating machine, and thus originally has high strength and rigidity. Thus, the retarder can be arranged on the combined power transmission shaft without any special reinforcement, etc. and a predetermined braking force can be generated by the single retarder. Accordingly, it is possible to eliminate a propeller shaft and to form a compact electric drive device including the first rotating machine, the second rotating machine, the retarder, and the differential device, which is advantageous in terms of space.

That is, when the retarder is arranged on one of the output shafts of the first and second rotating machines so as to obtain a predetermined braking force, it is necessary to reinforce the output shaft, a gear, etc., and thus downsizing of the electric drive device is hindered. If the retarder is provided on both the output shafts of the first rotating machine and the second rotating machine, a required braking force of each of the retarders is reduced and the reinforcement is not required. However, the total arrangement space for the two retarders is large, which also inhibits the downsizing of the electric drive device.

In the electric drive device according to the second aspect, the first rotating machine, the second rotating machine, and the combined power transmission shaft may be arranged such that the axis of the first rotating machine, the axis of the second rotating machine, and the axis of the combined power transmission shaft are all arranged parallel to a width direction of the vehicle. The combined power transmission shaft on which the retarder is provided may be a pinion shaft provided with a drive pinion that meshes with a ring gear of the differential device.

In the above configuration, the first rotating machine, the second rotating machine, and the combined power transmission shaft are all arranged parallel to the width direction of the vehicle, and the combined power transmission shaft on which the retarder is provided is the pinion shaft. Thus, dimensions of the electric drive device in the front-rear direction of the vehicle can be reduced, and thus, the electric drive device can be made more compact. Further, paralleled gears such as helical gears can be adopted as the ring gear of the differential device and the drive pinion, so that the transmission efficiency is improved as compared with hypoid gears.

In the electric drive device according to the second aspect, the first rotating machine, the second rotating machine, and the retarder may be arranged on opposite sides of an axis of the differential device in a front-rear direction of the vehicle in a plan view seen from above the vehicle. The axis of the differential device may be parallel to the width direction of the vehicle.

In the above configuration, the first rotating machine, the second rotating machine, and the retarder are arranged on the opposite sides of the axis of the differential device in the front-rear direction of the vehicle in the plan view seen from above the vehicle. This improves the weight balance of the electric drive device for a vehicle between the parts forward and rearward of the axis of the differential device in the front-rear direction of the vehicle, which is advantageous in terms of strength and enables the weight reduction and further downsizing of the electric drive device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating yet another embodiment of the first mode, and is a skeleton diagram corresponding to FIG. 2, in which the case is omitted;

FIG. 6 is a diagram illustrating yet another embodiment of the first mode, and is a skeleton diagram corresponding to FIG. 2, in which the case is omitted;

FIG. 9 is a diagram illustrating yet another embodiment of the first mode, and is a skeleton diagram corresponding to FIG. 2, in which the case is omitted;

FIG. 10 is a diagram illustrating yet another embodiment of the first mode, and is a skeleton diagram corresponding to FIG. 2, in which the case is omitted;

FIG. 19 is a diagram illustrating yet another embodiment of the first mode, and is a skeleton diagram corresponding to FIG. 2, in which the case is omitted;

FIG. 20 is a diagram illustrating a schematic configuration of an electric drive device for a vehicle, which is an embodiment of a second mode, and is a skeleton diagram in a plan view seen from above the vehicle;

DETAILED DESCRIPTION OF EMBODIMENTS

Figure 1:
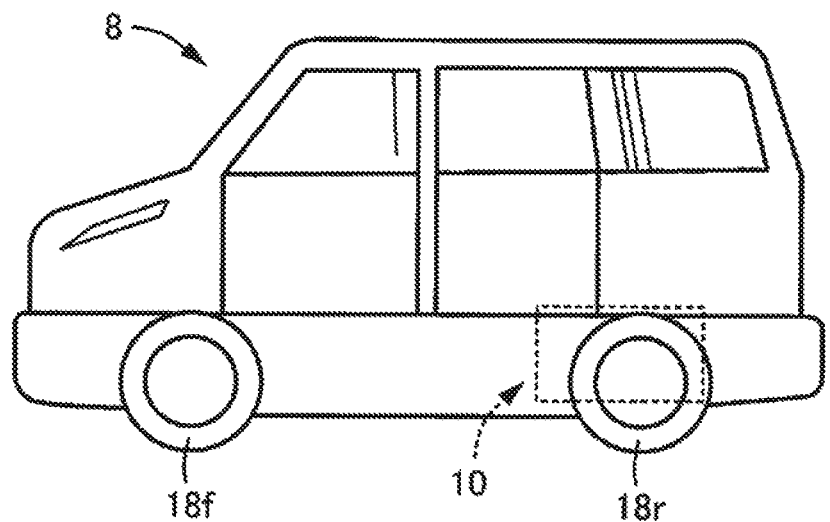
FIG. 1 is a schematic left side view of an electric vehicle with a driving force source disposed in a rear part of the vehicle, as viewed from a left side, which includes an electric drive device for a vehicle according to an embodiment of a first mode.

The disclosure relates to an electric drive device for a vehicle, which includes at least a rotating machine functioning as an electric motor so as to be used as a driving force source for traveling. The disclosure may be applied to an electric vehicle that travels only with the rotating machine. However, the disclosure may also be applied to, for example, a series hybrid vehicle including an engine (internal combustion engine) dedicated to power generation, a parallel hybrid vehicle including an engine as a driving force source, and the like. The electric vehicle may be one that travels using only an in-vehicle battery as a power source, but may be one on which a power generation device such as a fuel cell is mounted. As the rotating machine used as a driving force source, a motor generator may be used that can selectively be used as an electric motor and a generator.

The disclosure may be applied to a rear-wheel drive vehicle with a driving force source disposed in a rear part of the vehicle or a front-wheel drive vehicle with a driving force source disposed in a front part of the vehicle. When the front and rear wheels are driven using different driving force sources in the front and rear wheel drive vehicle, the electric drive device for a vehicle according to the disclosure may be used as a drive device for either the front wheels or the rear wheels. That is, the disclosure may be applied to an electric drive device for a vehicle, in which a transaxle including a differential device and a rotating machine are assembled to a common case. As the differential device, a differential gear device of a bevel gear type or a planetary gear type may be adopted. For example, when a pair of clutches are provided that can control individual power transmission states of the right and left driving wheels, the clutches can be regarded as a differential device.

A speed change mechanism such as a speed reduction mechanism or a speed increasing mechanism is disposed between an output shaft of the rotating machine and the differential device, as necessary. The speed change mechanism may be a speed change mechanism that changes speed with a constant gear ratio, such as a parallel-axis speed change mechanism or a planetary gear speed change mechanism. Alternatively, a stepped transmission that establishes a plurality of gear stages with different gear ratios with an engagement device such as clutches and brakes, or a belt-type continuously variable transmission may be provided as the speed change mechanism.

As a retarder, an electromagnetic retarder that generates a braking force using an eddy current generated by an electromagnetic induction may be used. However, a fluid retarder may also be adopted. In the case of the electromagnetic retarder that generates a braking force with an electromagnet, the braking force can be increased or decreased by controlling an excitation current of the electromagnet. An electromagnetic retarder may be used that generates a braking force using a permanent magnet instead of the electromagnet, or in addition to the electromagnet.

In a first mode of the disclosure, the rotating machine and the retarder are arranged on the opposite sides of an axis of the differential device in a front-rear direction of the vehicle (hereinafter, also referred to as "vehicle front-rear direction"). However, in the case of the electric drive device having a plurality of rotating machines, only at least one of the rotating machines and the retarder are required to be arranged on the opposite sides of the axis of the differential device in the vehicle front-rear direction. The rotating machine and the retarder are arranged such that their axes are all parallel to the vehicle front-rear direction, for example, and the rotating machine and the retarder may be arranged on a common single axis, or alternatively, the rotating machine and the retarder may be arranged on the different axes. However, the axes of the rotating machine and the retarder do not necessarily have to be parallel to the vehicle front-rear direction. The rotating machine and the retarder may be arranged such that one or both of their axes are parallel to a width direction of the vehicle (hereinafter, also referred to as "vehicle width direction").

In carrying out a second mode of the disclosure, for example, a first rotating machine, a second rotating machine, and a combined power transmission shaft are arranged such that their axes are all parallel to the vehicle width direction. However, the first rotating machine, the second rotating machine, and the combined power transmission shaft may be arranged such that at least one of their axes is parallel to the vehicle front-rear direction. A pinion shaft is suitably used as the combined power transmission shaft on which the retarder is disposed. However, when there is an intermediate shaft or the like that functions as the combined power transmission shaft between the first and second rotating machines and the pinion shaft, the retarder may be disposed on the intermediate shaft or the like. In addition, the first rotating machine, the second rotating machine, and the retarder are arranged on the opposite sides of the axis of the differential device in the vehicle front-rear direction in the plan view seen from above the vehicle, for example. However, the first rotating machine, the second rotating machine, and the retarder may be collectively arranged forward or rearward of the axis of the differential device in the vehicle front-rear direction in the plan view seen from above the vehicle. The first rotating machine, the second rotating machine, and the retarder may be of any form. For example, the first rotating machine and the second rotating machine are arranged on one side in the vehicle front-rear direction and the retarder is arranged on the other side in the vehicle front-rear direction. Further, the first rotating machine and the second rotating machine may be arranged on the opposite sides in the vehicle front-rear direction, and the retarder may be arranged on one side in the vehicle front-rear direction. In other words, the retarder and at least one of the first and second rotating machines may be arranged on the opposite sides in the vehicle front-rear direction.

Hereinafter, embodiments of the disclosure will be described in detail with reference to the drawings. In the following embodiments, the drawings are appropriately simplified or modified for description, and dimensional ratios, shapes, and the like of various parts are not necessarily accurate.

Figure 2:
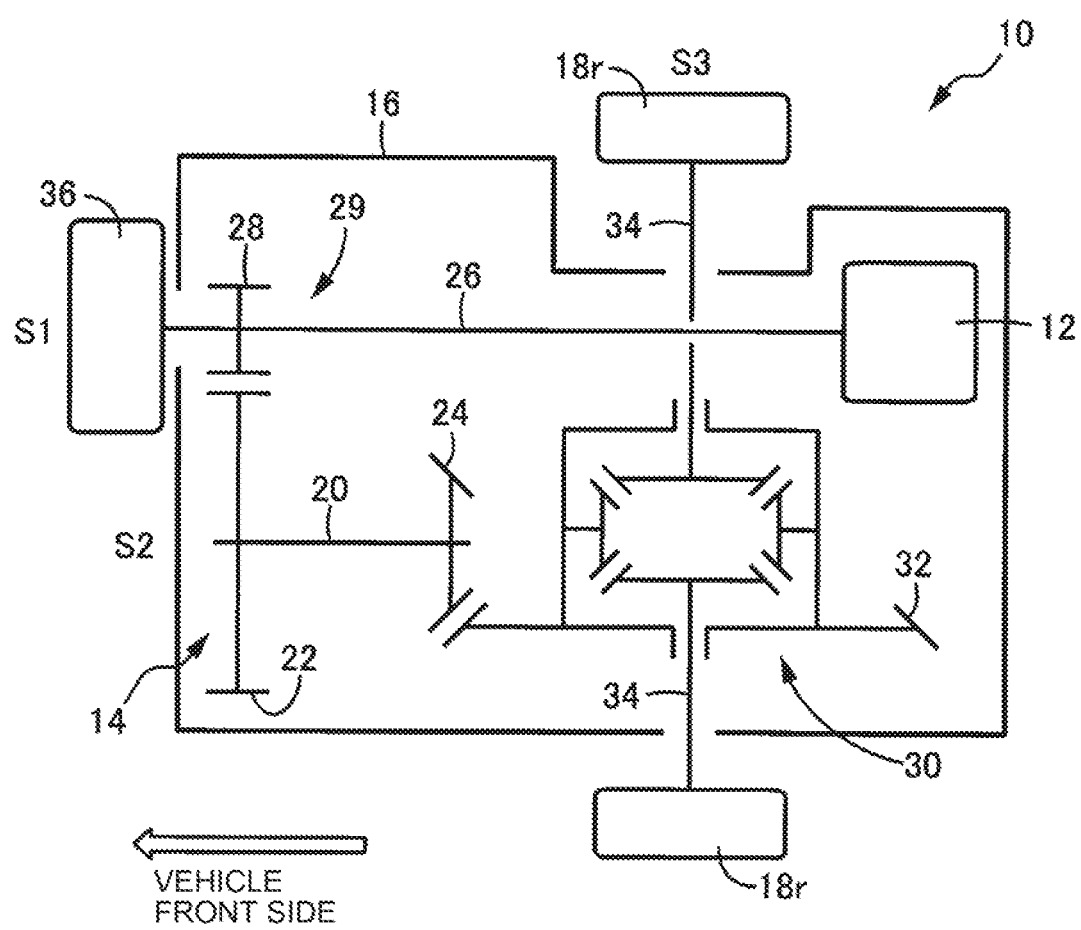
FIG. 2 is a diagram illustrating a schematic configuration of the electric drive device mounted on the electric vehicle in FIG. 1, and is a skeleton diagram in a plan view seen from above the vehicle.

FIG. 1 is a schematic left side view of an electric vehicle 8 including an electric drive device for a vehicle according to an embodiment of the first mode as viewed from a left side. FIG. 2 is a diagram illustrating a schematic configuration of an electric drive unit 10 mounted on the electric vehicle 8, and is a skeleton diagram in a plan view seen from above the vehicle and developed such that a plurality of axes (a first axis S1 to a third axis S3) are included in one plane. The electric drive unit 10 can be regarded as the electric drive device for a vehicle. The electric drive unit 10 includes a rotating machine 12, a transaxle 14, and a case 16. The rotating machine 12 is disposed on the first axis S1 parallel to the vehicle front-rear direction and used as the driving force source. The transaxle 14 is a power transmission mechanism for transmitting power of the rotating machine 12 to the right and left rear wheels 18r serving as driving wheels. The case 16 holds the rotating machine 12 and the transaxle 14. The rotating machine 12 is accommodated in the case 16, for example, but can be fixed to an outer side of the case 16 so that the rotating machine 12 and the case 16 are integrated. The case 16 is composed of a plurality of members as needed. The first axis Si coincides with an axis of the rotating machine 12. The first axis Si is set to be substantially horizontal, for example, but may be inclined toward a vertical direction with respect to the vehicle front-rear direction.

The electric vehicle 8 includes only a single rotating machine 12 as a driving force source. The rotating machine 12 functions selectively as an electric motor or a generator, and is a so-called motor generator. The rotating machine 12 is used as a driving force source for traveling. The rotating machine 12 is also subjected to a regenerative control during traveling of the electric vehicle 8 to function as a generator, thereby generating a regenerative braking force. The electric vehicle 8 is a passenger car, but the disclosure can also be applied to an electric drive device for other electric vehicles such as trucks and buses. The electric drive unit 10 is disposed in a rear part of the electric vehicle 8 and rotationally drives the rear wheels 18r. That is, the electric vehicle 8 of the present embodiment is a rear wheel-drive vehicle with the driving force source disposed in the rear part of the vehicle, in which the electric drive unit 10 is disposed in the rear part of the vehicle to rotationally drive the rear wheels 18r for traveling. Alternatively, a front wheel-drive vehicle with the driving force source disposed in the front part of the vehicle may be adopted, in which the electric drive unit 10 of the embodiment is disposed in the front part of the electric vehicle 8 to rotationally drive the right and left front wheels 18f for traveling.

The transaxle 14 can be regarded as a power transmission mechanism that transmits the power of the rotating machine 12 to the rear wheels 18r, and includes a pinion shaft 20 disposed on the second axis S2 that is parallel to the first axis S1. The second axis S2 coincides with an axis of the pinion shaft 20. The second axis S2 is set to a position adjacent to the first axis Si in a vehicle width direction and offset downward of, for example, the third axis S3 that is an axis of the differential device 30 in a height direction of the vehicle (hereinafter, also referred to as "vehicle height direction"). The pinion shaft 20 is provided with a large-diameter gear 22 and a small diameter drive pinion 24. The large-diameter gear 22 is meshed with a small-diameter gear 28 provided on an output shaft 26 of the rotating machine 12, and the rotation transmitted from the rotating machine 12 is decelerated and transmitted to the pinion shaft 20. The large-diameter gear 22 and the small-diameter gear 28 form a gear-type speed reduction mechanism 29. The drive pinion 24 is meshed with the ring gear 32 of the differential device 30, and the power output from the rotating machine 12 is transmitted to the differential device 30 via the pinion shaft 20. That is, in the electric vehicle 8 of the present embodiment, the rotation transmitted from the output shaft 26 of the rotating machine 12 to the pinion shaft 20 via the gear-type speed reduction mechanism 29 is transmitted to the differential device 30 as it is. Thus, the electric vehicle 8 is a propeller-less electric vehicle with no propeller shaft. The drive pinion 24 and the ring gear 32 are hypoid gears.

The differential device 30 is disposed on the third axis S3 parallel to the vehicle width direction. The differential device 30 is a bevel-gear differential device, and transmits the power transmitted to the ring gear 32, from a pair of side gears to the right and left rear wheels 18r via a pair of right and left drive shafts 34. The third axis S3 coincides with the axes of the differential device 30 and the drive shaft 34.

The electric drive unit 10 includes a retarder 36 serving as a braking device that can be used as an auxiliary brake, in addition to a regenerative brake operated based on regenerative control of the rotating machine 12. That is, when the regenerative control of the rotating machine 12 is impossible due to a fully-charged battery or the like, the retarder 36 can be used as the auxiliary brake, and a frequent use of a wheel brake that is a service brake can be suppressed. The retarder 36 is an electromagnetic retarder that generates a braking force with an eddy current generated by an electromagnetic induction, and is attached to the output shaft 26. A first end portion of the output shaft 26, that is, a protruding end of the output shaft 26 protruding from the rotating machine 12, which is an end portion on a vehicle front side, i.e., a left side in FIG. 2, is provided so as to protrude from the case 16 to the outside, and the retarder 36 is attached to the protruding end portion. The first axis S1 coincides with an axis of the retarder 36. In the present embodiment, the output shaft 26 is disposed above the right drive shaft 34 and extends in a vehicle front-rear direction so as to intersect the drive shaft 34 at a right angle in a plan view shown in FIG. 2. The rotating machine 12 is disposed rearward of the third axis S3 that is the axis of the drive shaft 34, in the vehicle front-rear direction. The retarder 36 is disposed forward of the third axis S3 in the vehicle front-rear direction. The output shaft 26 is composed of a plurality of members connected by splines or the like as necessary. The rotating machine 12, the retarder 36, the differential device 30, and the like are assembled to the common case 16 so that the electric drive unit 10 is formed as a single unit. The electric drive unit 10 may be configured with arrangement of the members reversed laterally, and the output shaft 26 may be disposed above the left drive shaft 34. The same applies to the following embodiments.

Figure 3:
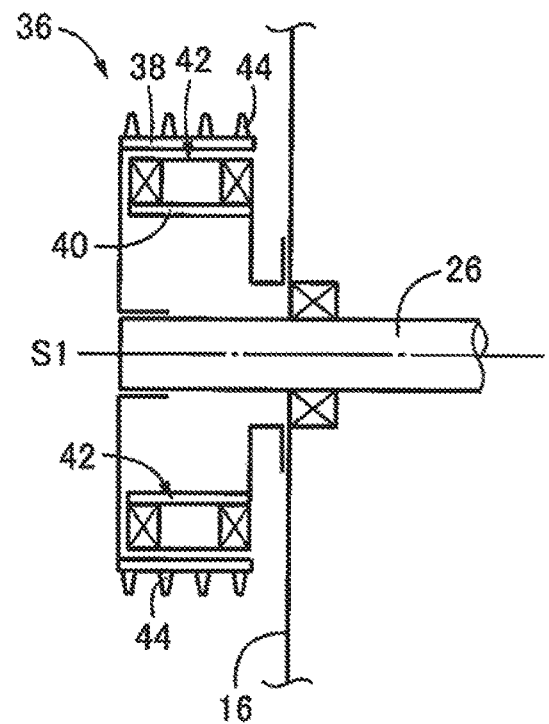
FIG. 3 is a schematic sectional view illustrating an example of an electromagnetic retarder provided in the electric drive device in FIG. 2.

FIG. 3 is a schematic sectional view illustrating an example of the electromagnetic retarder 36. The retarder 36 includes a cylindrical rotary member 38 and a cylindrical fixed member 40. The rotary member 38 is connected to the output shaft 26 via a rotation stopper such as a spline so as not to rotate relative to the output shaft 26. The fixed member 40 is disposed radially inward of the rotary member 38 and fixed to the case 16. Both the rotary member 38 and the fixed member 40 are provided coaxially with the first axis S1. The fixed member 40 is provided with multiple electromagnets 42 arranged side by side in a circumferential direction so that the electromagnets 42 face an inner peripheral surface of the rotary member 38 with a slight gap therebetween. The rotation of the rotary member 38 is braked with a braking force corresponding to an excitation current of the electromagnets 42, and the rotation of the output shaft 26 and further the rotation of the rear wheels 18r are accordingly braked. Multiple cooling fins 44 are provided on an outer peripheral surface of the rotary member 38 so as to protrude radially outward.

In the present embodiment, the rotary member 38 and the electromagnets 42 are provided so as to face each other across a cylindrical gap centered on the first axis S1. However, the rotary member 38 and the electromagnets 42 can also be arranged side by side in the direction in which the first axis S1 extends so as to be substantially parallel to each other and to face each other across a disc-shaped gap extending perpendicular to the first axis S1. Alternatively, the electromagnets 42 are provided in the rotary member 38. Thus, various forms of the retarder 36 may be adopted. In addition, the air-cooled retarder 36 is used and disposed outside the case 16 in the present embodiment. However, the retarder 36 may be disposed inside the case 16 and cooled by lubricating oil or the like.

In the electric drive unit 10 of the electric vehicle 8 described above, the rotating machine 12 and the retarder 36 are arranged on the opposite sides of the third axis S3 that is the axis of the differential device 30 in the vehicle front-rear direction, in a plan view seen from above the vehicle. This improves a weight balance between parts forward and rearward of the third axis S3, which is the axis of the differential device 30, in the vehicle front-rear direction in the electric drive unit 10. Accordingly, it is possible to eliminate the propeller shaft and to integrally assemble the rotating machine 12, the retarder 36, the gear-type speed reduction mechanism 29, and the differential device 30 to the case 16. This makes the electric drive unit 10 compact, which is advantageous in terms of space. In other words, if the weight balance is poor, it is necessary to increase strength, rigidity, etc. of each of various parts including the case 16, which hinders downsizing.

Moreover, since both the rotating machine 12 and the retarder 36 are arranged on the common first axis Si so as to be parallel to the vehicle front-rear direction, dimensions of the electric drive unit 10 in the vehicle width direction can be reduced.

Furthermore, since the weight balance is good, requirements in the strength and the rigidity of the case 16 are relaxed, and the weight of the electric drive unit 10 can be reduced.

The rotation transmitted from the output shaft 26 of the rotating machine 12 is decelerated by the gear-type speed reduction mechanism 29 and transmitted to the differential device 30. Since the retarder 36 is provided on the output shaft 26, that is, upstream of deceleration, a relatively small braking torque is required of the retarder 36. Thus, it is possible to use the compact retarder 36 to arrange the electric drive unit 10 in a smaller space.

Next, other embodiments of the disclosure will be described. In the following embodiments, parts substantially the same as those in the above embodiment are denoted by the same reference characters, and detailed description thereof will be omitted.

Figure 4:
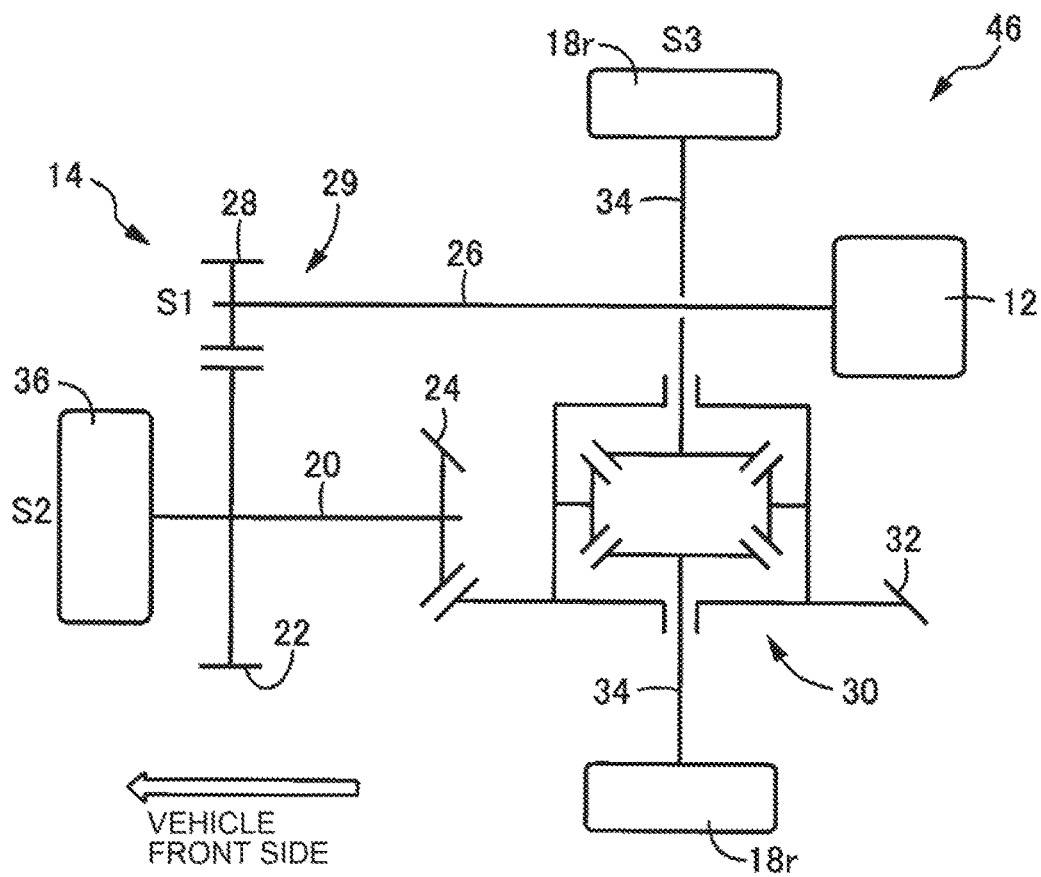
FIG. 4 is a diagram illustrating another embodiment of the first mode, and is a skeleton diagram corresponding to FIG. 2, in which a case is omitted.

FIGS. 4 to 19 are diagrams illustrating the other embodiments of the first mode, and are skeleton diagrams of the electric drive units, which correspond to FIG. 2 and in which the case 16 is omitted. An electric drive unit 46 in FIG. 4 is different from the electric drive unit 10 in that the retarder 36 is disposed on the second axis S2 and attached to the pinion shaft 20. In this case, the second axis S2 coincides with the axis of the retarder 36. When the retarder 36 is provided on the pinion shaft 20, a rotational speed of the retarder 36 is reduced and the rotation balance is improved so that rotational vibration is suppressed, as compared with the case where the retarder 36 is provided on the output shaft 26 of the rotating machine 12 as in the above-described embodiment. Therefore, the electric drive unit 46 is suitably applied to an electric vehicle in which a slight rotational vibration may cause a problem, an electric vehicle in which a rotational vibration is likely to occur due to a high rotational speed.

In an electric drive unit 48 in FIG. 5, the rotating machine 12 and the retarder 36 are arranged reversely, compared with the electric drive unit 10. The rotating machine 12 is arranged forward of the third axis S3, which is the axis of the differential device 30, in the vehicle front-rear direction and the retarder 36 is arranged rearward of the third axis S3 in the vehicle front-rear direction. In this case, for example, the rotating machine 12 that uses a high voltage of about 50V or higher is arranged forward of the third axis S3 in the vehicle front-rear direction, so that safety at the time of a rear collision due to a collision from the rear or the like is improved.

An electric drive unit 50 in FIG. 6 is different from the electric drive unit 10 in that a two-stage parallel-axis transmission 52 is disposed between the output shaft 26 and the pinion shaft 20. The parallel-axis transmission 52 includes a pair of speed change drive gears 54, 56, a pair of speed change driven gears 58, 60, and a meshing clutch mechanism 62. The speed change drive gears 54, 56 are rotatably disposed around the first axis Si so as to be rotatable relative to the output shaft 26. The speed change driven gears 58, 60 are disposed on the pinion shaft 20 so as to mesh with the speed change drive gears 54, 56. The meshing clutch mechanism 62 has a synchromesh mechanism and selectively connects the speed change drive gears 54, 56 to the output shaft 26. When the speed change drive gear 54 is connected to the output shaft 26, a low gear stage with a large gear ratio (=input rotational speed/output rotational speed) is established. When the speed change drive gear 56 is connected to the output shaft 26, a high gear stage with a small gear ratio is established. When neither of the speed change drive gears 54, 56 is connected to the output shaft 26, a neutral state is established in which the rotating machine 12 is separated from the power transmission path. The retarder 36 is connected, through a hollow connecting shaft 64, to the speed change drive gear 54 for the low gear stage with the large gear ratio, so as to apply a braking force. Instead of the meshing clutch mechanism 62, a single-plate or multiple-plate friction engagement clutch may be used.

In the present embodiment, the electric drive unit 50 can switch a torque transmitted from the rotating machine 12 in two stages, i.e., between high and low with the parallel-axis transmission 52 in accordance with a running load, a required output, etc. to transmit the torque to the pinion shaft 20. Therefore, driving force performance and drivability of the electric vehicle 8 are improved. Since the retarder 36 is connected to the speed change drive gear 54 for the low gear stage, the electric drive unit 50 can apply a large braking force with a small braking torque as the electric drive unit 10. The retarder 36 may be connected to the output shaft 26 and connected to the power transmission path via the parallel-axis transmission 52.

Figure 7:
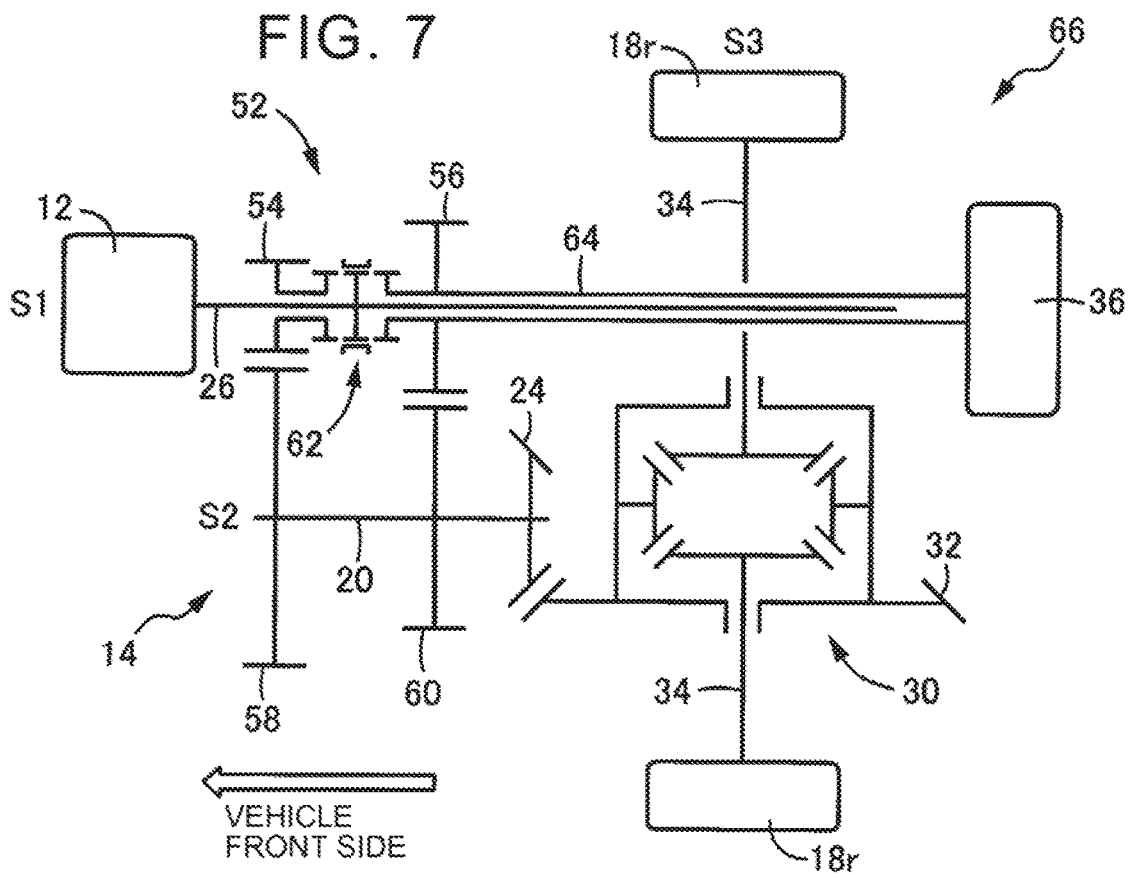
FIG. 7 is a diagram illustrating yet another embodiment of the first mode, and is a skeleton diagram corresponding to FIG. 2, in which the case is omitted.

In an electric drive unit 66 in FIG. 7, the rotating machine 12 and the retarder 36 are arranged reversely, compared with the electric drive unit 50. The rotating machine 12 is arranged forward of the third axis S3, which is the axis of the differential device 30, in the vehicle front-rear direction, and the retarder 36 is arranged rearward of the third axis S3 in the vehicle front-rear direction. The retarder 36 is connected, through the connecting shaft 64, to the speed change drive gear 56 for the high gear stage with the small gear ratio, so as to apply a braking force. Thus, the rotational speed of the retarder 36 of the electric drive unit 66 is lower than that of the electric drive unit 50, which improves a rotation balance.

Figure 8:
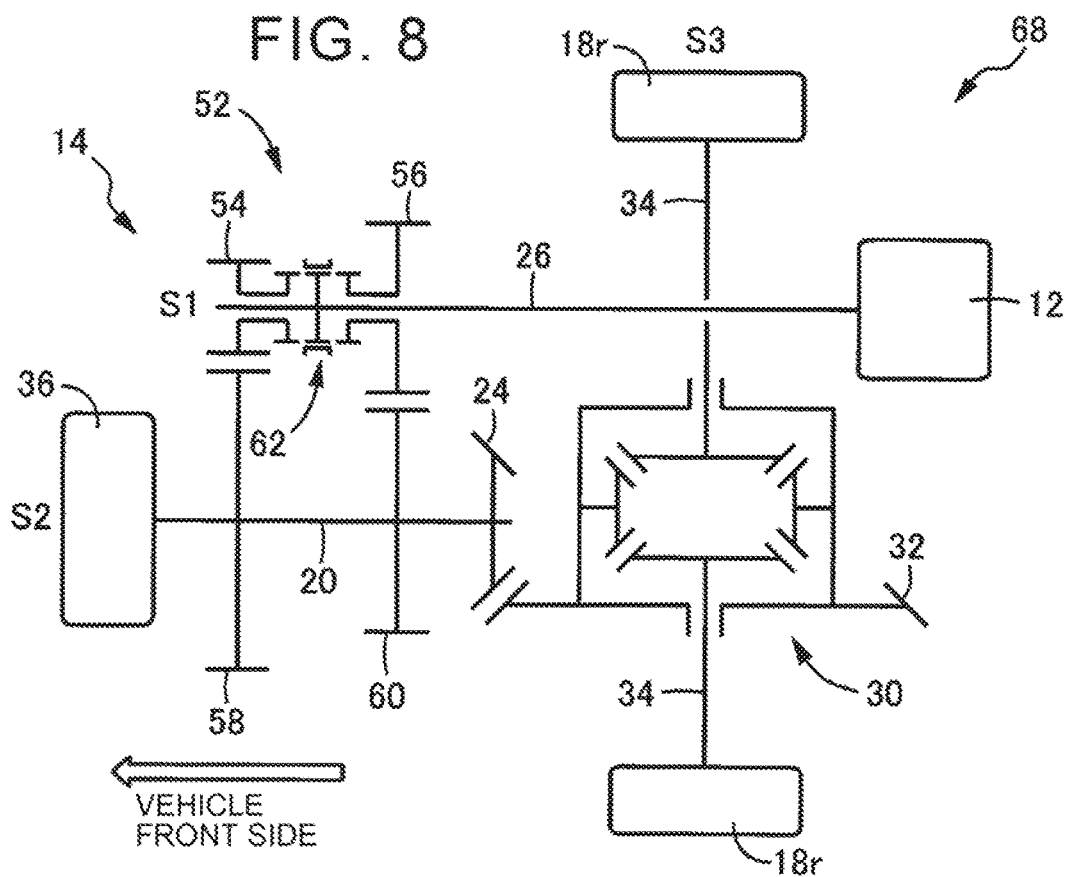
FIG. 8 is a diagram illustrating yet another embodiment of the first mode, and is a skeleton diagram corresponding to FIG. 2, in which the case is omitted.

An electric drive unit 68 in FIG. 8 is different from the electric drive unit 50 in FIG. 6 in that the retarder 36 is disposed on the second axis S2 and attached to the pinion shaft 20. In this case, the rotational speed of the retarder 36 is reduced, and the rotation balance is improved, as in the electric drive unit 46 in FIG. 4.

An electric drive unit 70 in FIG. 9 is different from the electric drive unit 50 in FIG. 6 in that a fourth axis S4 is defined between the first axis S1 and the second axis S2 in the vehicle width direction so as to be parallel to the axes S1, S2, namely, parallel to the vehicle front-rear direction, and an intermediate shaft 72 is disposed on the fourth axis S4. The fourth axis S4 coincides with the axis of the intermediate shaft 72. The intermediate shaft 72 is provided with the pair of speed change driven gears 58, 60 of the parallel-axis transmission 52 and the small-diameter gear 28 of the gear-type speed reduction mechanism 29. The intermediate shaft 72 is connected to the pinion shaft 20 via the gear-type speed reduction mechanism 29. In this case, the gear ratio (reduction ratio) of the entire power transmission mechanism including the parallel-axis transmission 52 can be made larger than that of the electric drive unit 50 in FIG. 6. In the present embodiment, the positions of the pair of speed change drive gears 54, 56 of the parallel-axis transmission 52 is reversed with respect to those in the electric drive unit 50 in FIG. 6, and the retarder 36 is connected to the speed change drive gear 56 for the high gear stage with the small gear ratio so as to apply a braking force.

The electric drive unit 74 in FIG. 10 is different from the electric drive unit 70 in FIG. 9 in that the retarder 36 is disposed on the fourth axis S4 and attached to the intermediate shaft 72. In this case, the fourth axis S4 coincides with the axis of the retarder 36. When the retarder 36 is provided on the intermediate shaft 72 as described above, the rotational speed of the retarder 36 is reduced and the rotation balance is improved.

Figure 11:
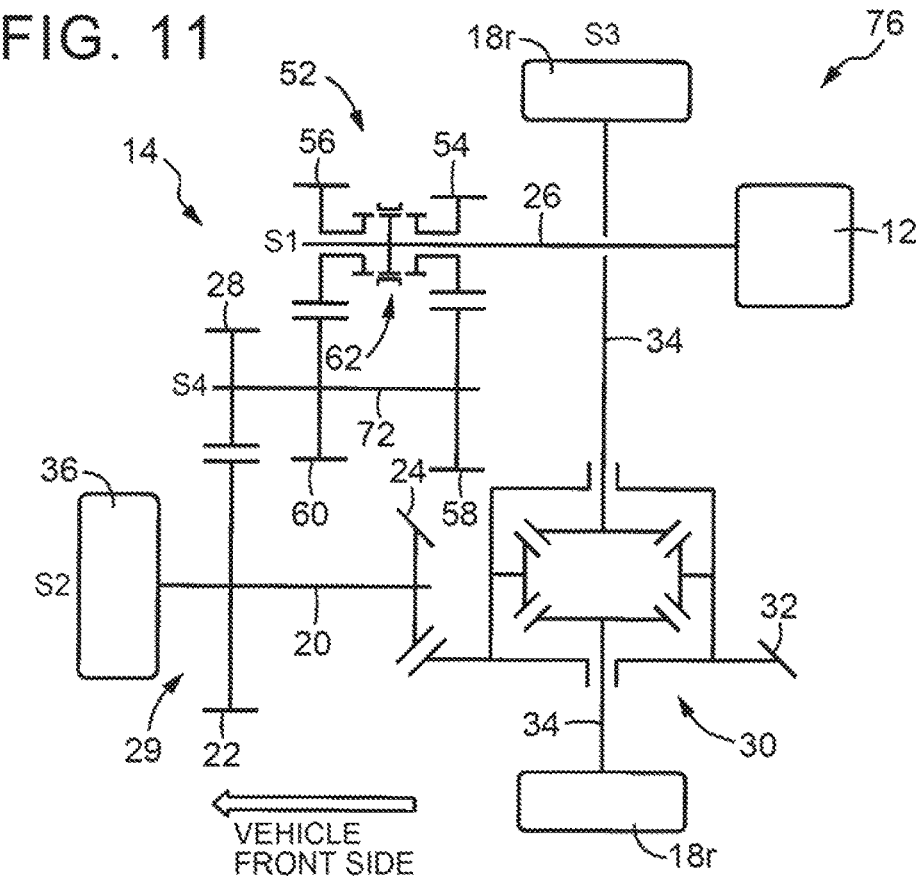
FIG. 11 is a diagram illustrating yet another embodiment of the first mode, and is a skeleton diagram corresponding to FIG. 2, in which the case is omitted.

An electric drive unit 76 in FIG. 11 is different from the electric drive unit 70 in FIG. 9 in that the retarder 36 is disposed on the second axis S2 and attached to the pinion shaft 20. In this case, the second axis S2 coincides with the axis of the retarder 36. When the retarder 36 is provided on the pinion shaft 20 as described above, the rotational speed of the retarder 36 is further reduced and the rotation balance is improved, compared with the electric drive unit 74 in FIG. 10.

Figure 12:
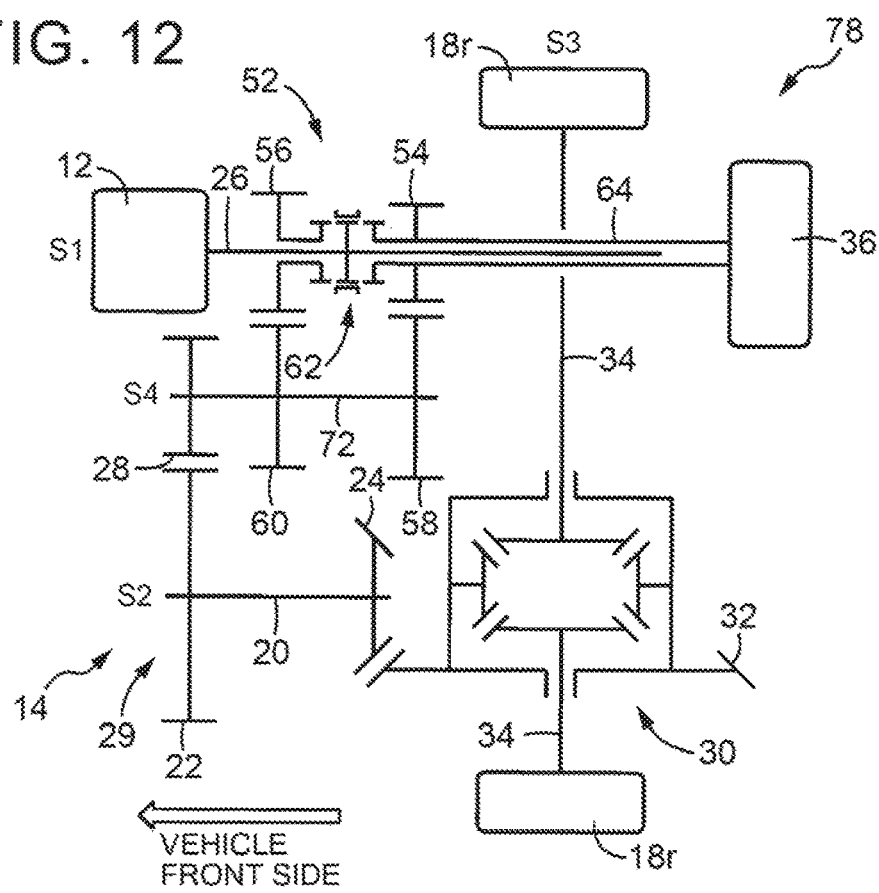
FIG. 12 is a diagram illustrating yet another embodiment of the first mode, and is a skeleton diagram corresponding to FIG. 2, in which the case is omitted.

In an electric drive unit 78 in FIG. 12, the rotating machine 12 and the retarder 36 are arranged reversely, compared with the electric drive unit 70 in FIG. 9. The rotating machine 12 is arranged forward of the third axis S3, which is the axis of the differential device 30, in the vehicle front-rear direction, and the retarder 36 is arranged rearward of the third axis S3 in the vehicle front-rear direction. The retarder 36 is connected to the speed change drive gear 54 for the high gear stage with the small gear ratio, so as to apply a braking force.

Figure 13:
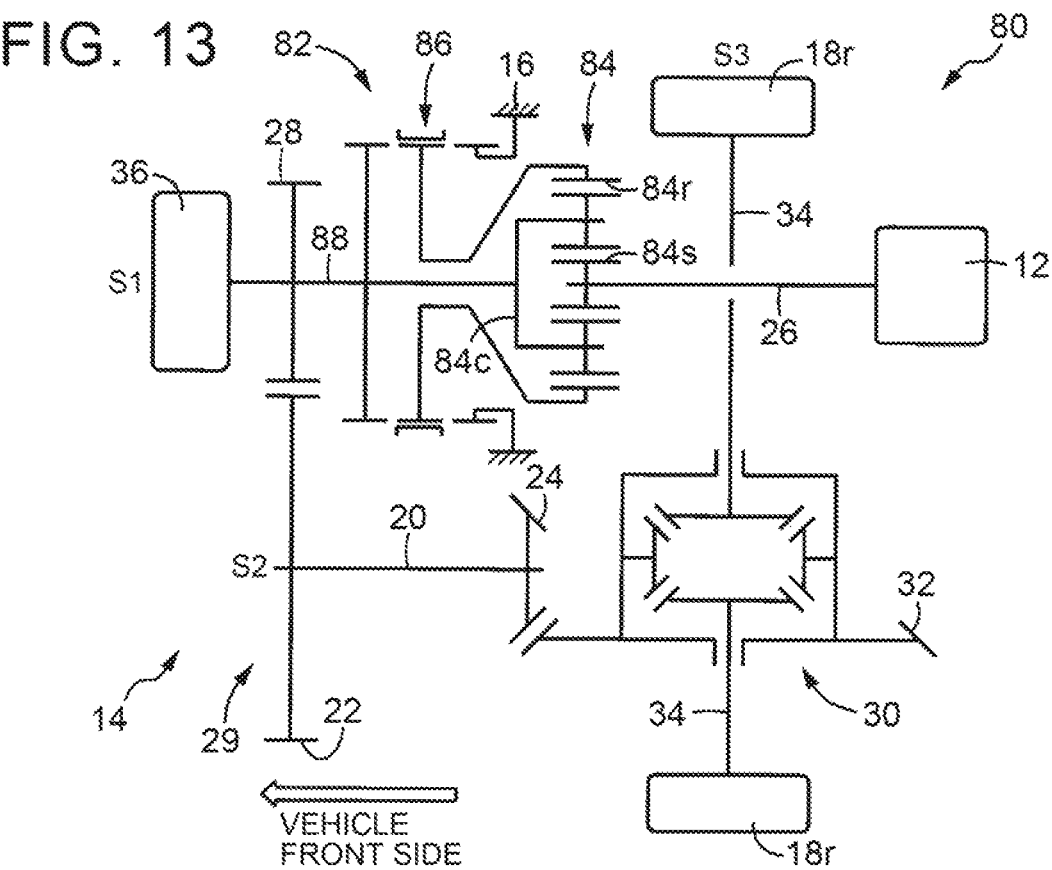
FIG. 13 is a diagram illustrating yet another embodiment of the first mode, and is a skeleton diagram corresponding to FIG. 2, in which the case is omitted.

An electric drive unit 80 in FIG. 13 is different from the electric drive unit 10 in that a planetary gear transmission 82 with two gear stages is provided on the output shaft 26. The planetary gear transmission 82 includes a single-pinion planetary gear unit 84 and a meshing clutch mechanism 86. The output shaft 26 is connected to a sun gear 84s of the planetary gear unit 84. The retarder 36 is connected to a carrier 84c via a transmission shaft 88. The transmission shaft 88 is coaxially disposed on the first axis S1. The meshing clutch mechanism 86 has a synchromesh mechanism and selectively connects the ring gear 84r of the planetary gear unit 84 to the case 16 or the transmission shaft 88. When the ring gear 84r is connected and fixed to the case 16, the low gear stage with the large gear ratio is established. When the ring gear 84r is connected to the transmission shaft 88, the high gear stage with the small gear ratio is established. The gear ratio of the high gear stage is "1". When the ring gear 84r is connected neither to the case 16 nor the transmission shaft 88, a neutral state is established in which the ring gear 84r is rotatable and the rotating machine 12 is separated from the power transmission path. The transmission shaft 88 is provided with the small-diameter gear 28 of the gear-type speed reduction mechanism 29. The transmission shaft 88 is connected to the pinion shaft 20 via the gear-type speed reduction mechanism 29.

Instead of the meshing clutch mechanism 86, a single-plate or multiple-plate friction engagement clutch and brake may be used. Alternatively, a double-pinion planetary gear unit or a plurality of planetary gear units may be used. Thus, various types of planetary gear transmissions may be adopted as the planetary gear transmission 82.

In the present embodiment, the electric drive unit 80 can switch a torque transmitted from the rotating machine 12 in two stages, i.e., between high and low, with the planetary gear transmission 82 in accordance with the running load, the required output, etc. and transmit the torque to the pinion shaft 20. Therefore, the driving force performance and the drivability of the electric vehicle 8 are improved, as in the electric drive unit 50 having the parallel-axis transmission 52.

Figure 14:
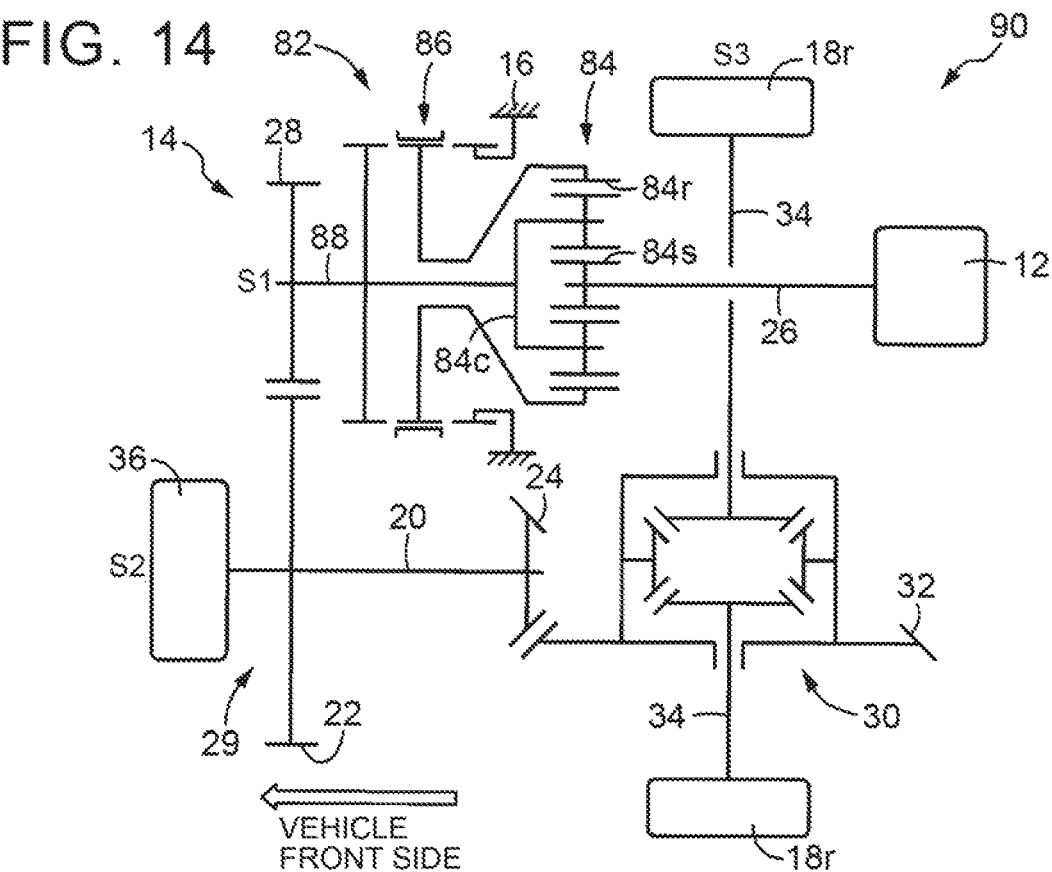
FIG. 14 is a diagram illustrating yet another embodiment of the first mode, and is a skeleton diagram corresponding to FIG. 2, in which the case is omitted.

An electric drive unit 90 in FIG. 14 is different from the electric drive unit 80 in FIG. 13 in that the retarder 36 is disposed on the second axis S2 and attached to the pinion shaft 20. In this case, the second axis S2 coincides with the axis of the retarder 36.

Figure 15:
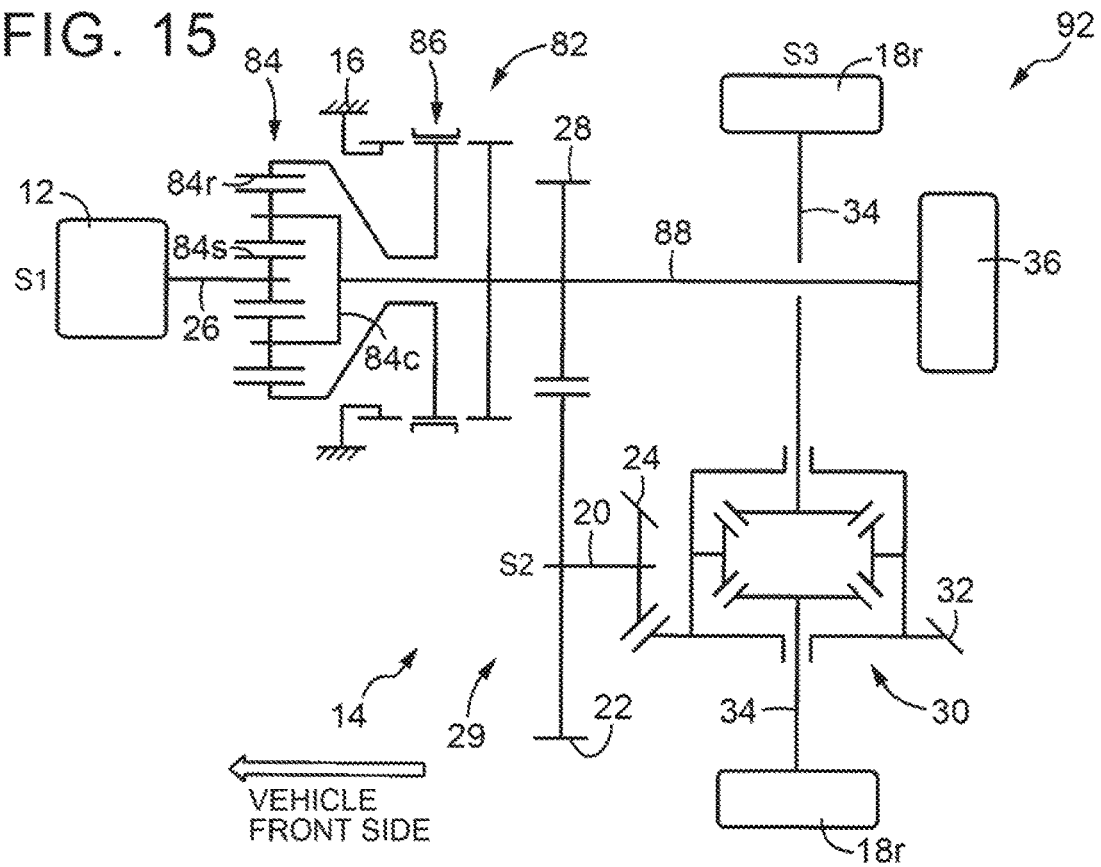
FIG. 15 is a diagram illustrating yet another embodiment of the first mode, and is a skeleton diagram corresponding to FIG. 2, in which the case is omitted.

In an electric drive unit 92 in FIG. 15, the rotating machine 12 and the retarder 36 are arranged reversely, compared with the electric drive unit 80 in FIG. 13. The rotating machine 12 is arranged forward of the third axis S3, which is the axis of the differential device 30, in the vehicle front-rear direction, and the retarder 36 is arranged rearward of the third axis S3 in the vehicle front-rear direction.

Figure 16:
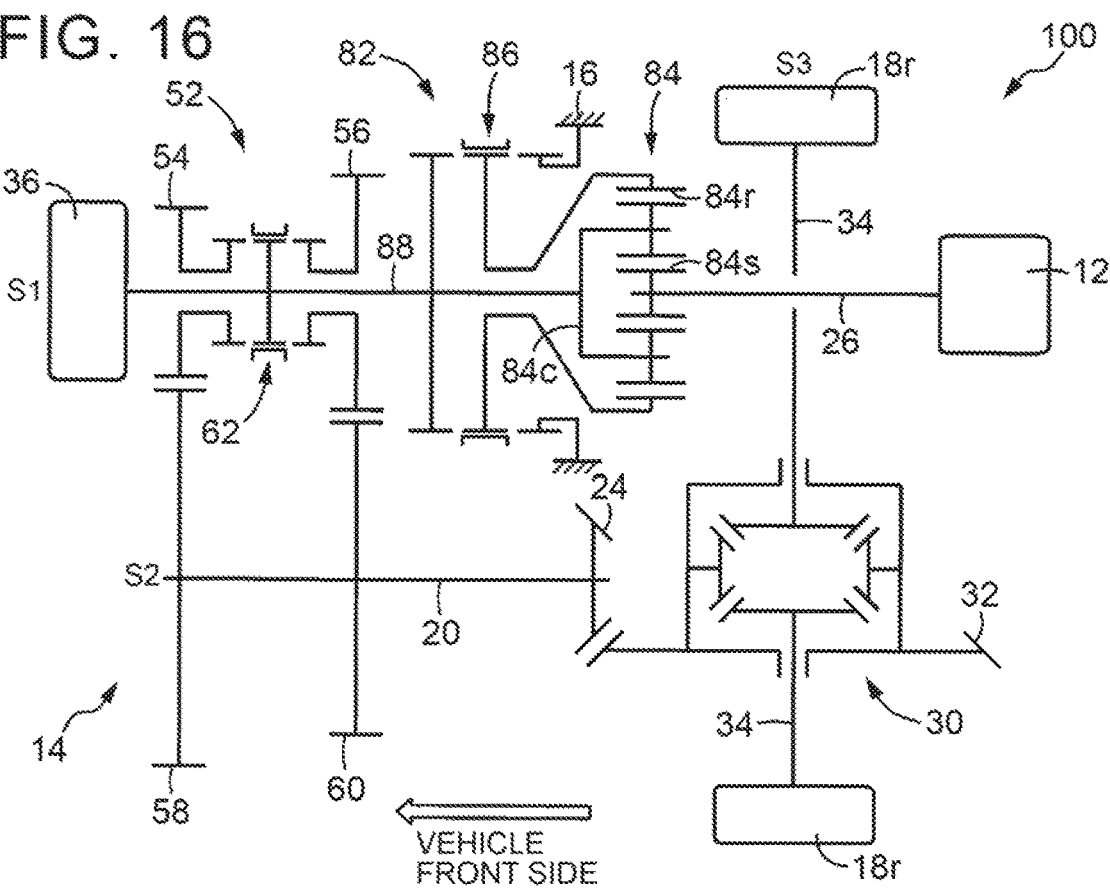
FIG. 16 is a diagram illustrating yet another embodiment of the first mode, and is a skeleton diagram corresponding to FIG. 2, in which the case is omitted.

An electric drive unit 100 in FIG. 16 includes both the parallel-axis transmission 52 and the planetary gear transmission 82. Specifically, the electric drive unit 100 is achieved by providing the parallel-axis transmission 52 between the transmission shaft 88 and the pinion shaft 20 in the electric drive unit 80 in FIG. 13 having the planetary gear transmission 82. In this case, four-stage gear shifting is possible. The electric drive unit 100 can switch a torque transmitted from the rotating machine 12 in four stages in accordance with the running load, the required output, etc. and transmit the torque to the pinion shaft 20. Therefore, the driving force performance and the drivability of the electric vehicle 8 are further improved.

In the electric drive unit 100 in FIG. 16, the parallel-axis transmission 52 and the planetary gear transmission 82 are both arranged forward of the third axis S3, which is the axis of the differential device 30, in the vehicle front-rear direction. However, in consideration of the weight balance and the like, the planetary gear transmission 82 may be disposed rearward of the third axis S3 in the vehicle front-rear direction. Further, the retarder 36 may be arranged on the second axis S2 and attached to the pinion shaft 20 as in the electric drive unit 90 in FIG. 14. Alternatively, the rotating machine 12 may be arranged forward of the third axis S3 in the vehicle front-rear direction and the retarder 36 may be arranged rearward of the third axis S3 in the vehicle front-rear direction, as in the electric drive unit 92 in FIG. 15.

Figure 17:
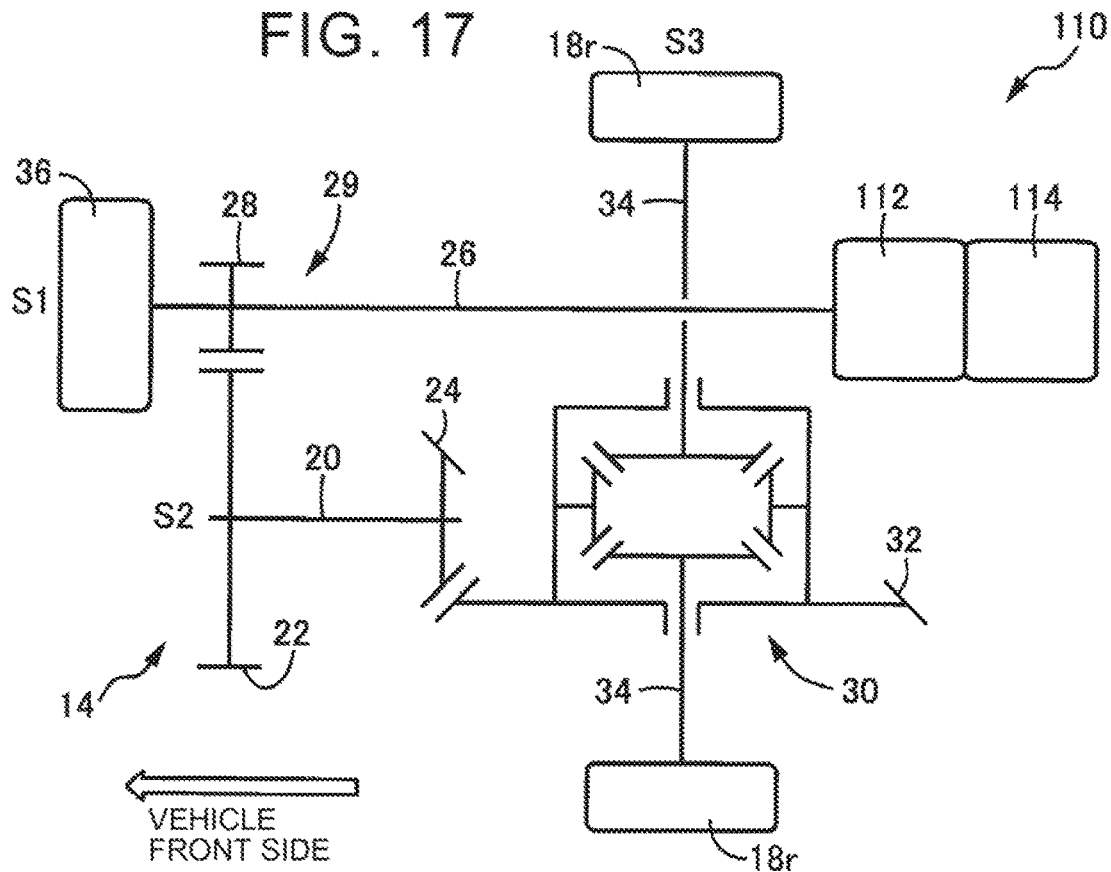
FIG. 17 is a diagram illustrating yet another embodiment of the first mode, and is a skeleton diagram corresponding to FIG. 2, in which the case is omitted.

An electric drive unit 110 in FIG. 17 is different from the electric drive unit 10 in that a pair of first rotating machine 112 and second rotating machine 114 are continuously provided in series on the first axis S1, instead of the single rotating machine 12. The first rotating machine 112 and the second rotating machine 114 are both motor generators, and the first axis Si coincides with axes of the first rotating machine 112 and the second rotating machine 114. In this case, since torques of the rotating machines 112, 114 can be individually reduced, it is possible to employ the rotating machines 112, 114 having small diameters, and reduce dimensions of the electric drive unit 110 in the vehicle width direction and the vehicle height direction.

Figure 18:
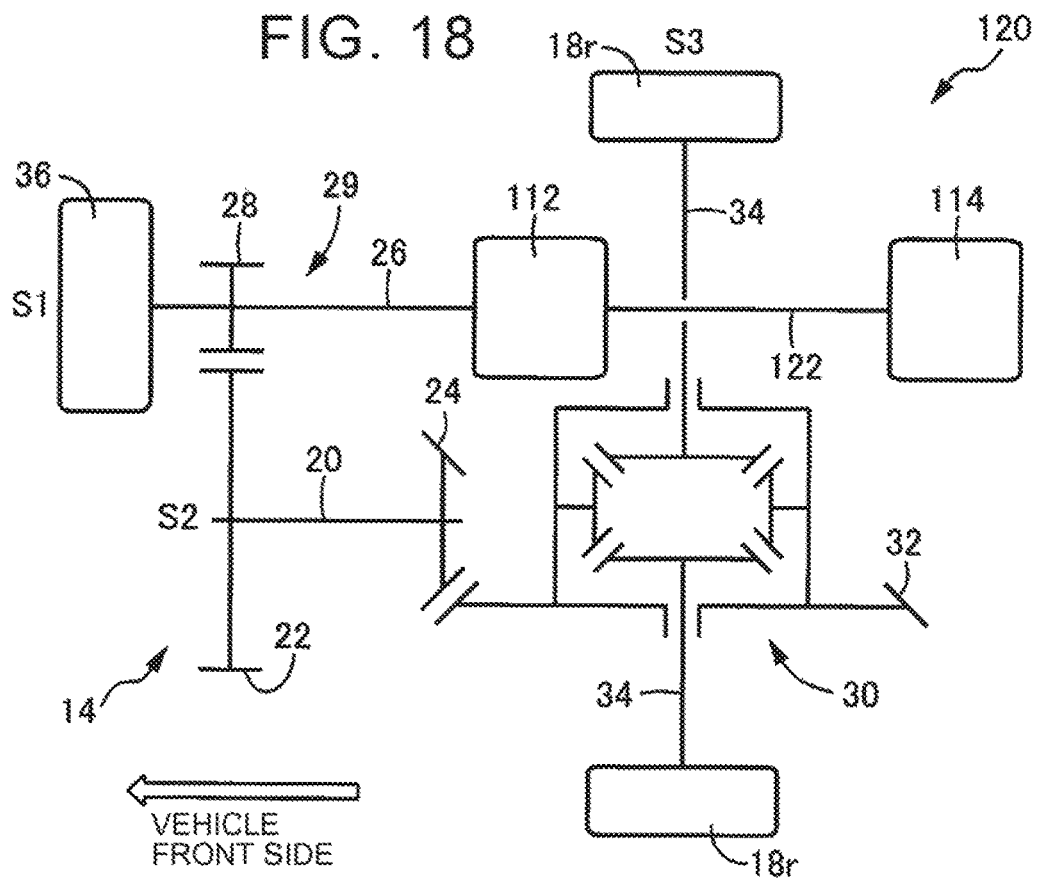
FIG. 18 is a diagram illustrating yet another embodiment of the first mode, and is a skeleton diagram corresponding to FIG. 2, in which the case is omitted.

An electric drive unit 120 in FIG. 18 is different from the electric drive unit 110 in that the first rotating machine 112 is arranged forward, namely, on the retarder 36 side, of the third axis S3, which is the axis of the differential device 30, in the vehicle front-rear direction, and the first rotating machine 112 is connected to the second rotating machine 114 arranged rearward of the third axis S3 in the vehicle front-rear direction via a connecting shaft 122. Even in this case, the second rotating machine 114, which is at least one of the pair of rotating machines 112, 114, is arranged on the opposite side of the third axis S3 from the retarder 36, that is, rearward of the third axis S3 in the vehicle front-rear direction. Therefore, the electric drive unit 120 with the good weight balance can be achieved.

In the electric drive unit 110 in FIG. 17 and the electric drive unit 120 in FIG. 18, the retarder 36 may be disposed on the second axis S2 and attached to the pinion shaft 20 as in the electric drive unit 46 in FIG. 4, or at least one of the first rotating machine 112 and the second rotating machine 114 may be arranged forward of the third axis S3 in the vehicle front-rear direction and the retarder 36 may be arranged rearward of the third axis S3 in the vehicle front-rear direction as in the electric drive unit 48 in FIG. 5.

In an electric drive unit 130 in FIG. 19, the first axis S1 that is the axis of the rotating machine 12 is defined parallel to the third axis S3 that is the axis of the differential device 30, namely, parallel to the vehicle width direction, and forward of the third axis S3 in the vehicle front-rear direction. The second axis S2 that is the axis of the pinion shaft 20 is defined parallel to the third axis S3, namely, parallel to the vehicle width direction, and rearward of the third axis S3 in the vehicle front-rear direction. The rotation transmitted from the rotating machine 12 is transmitted to the pinion shaft 20 via a gear-type speed reduction mechanism 132. The gear-type speed reduction mechanism 132 includes a hollow intermediate shaft 134 that is rotatably disposed around the third axis S3 so as to be rotatable relative to the drive shaft 34. The intermediate shaft 134 is provided with a large-diameter gear 136 and a small-diameter gear 138 for speed reduction. The large-diameter gear 136 is meshed with a small-diameter gear 140 provided on the output shaft 26, and the small-diameter gear 138 is meshed with a driven gear 142 provided on the pinion shaft 20. The rotation transmitted from the output shaft 26 is decelerated in accordance with gear ratios (ratios of the number of teeth) between the gears and transmitted to the pinion shaft 20. A drive pinion 144 is provided on the pinion shaft 20 and meshes with a ring gear 146 of the differential device 30. The drive pinion 144 and the ring gear 146 are paralleled gears such as helical gears etc.

The first axis S1 that is the axis of the rotating machine 12 and the second axis S2 that is the axis of the pinion shaft 20 to which the retarder 36 is attached may be defined at any positions around the third axis S3, and the positions may be changed as appropriate on condition that the first axis Si and the second axis S2 are located on the opposite sides of the third axis S3 in the vehicle front-rear direction in a plan view.

In the present embodiment, the rotating machine 12 and the retarder 36 are arranged on the opposite sides of the third axis S3, which is the axis of the differential device 30, in the vehicle front-rear direction, in a plan view seen from above the vehicle. This improves a weight balance of the electric drive unit 130 between the parts forward and rearward of the third axis S3, which is the axis of the differential device 30, in the vehicle front-rear direction, and thus, the same effects as those of the above embodiment can be obtained. Moreover, since both the rotating machine 12 and the pinion shaft 20 are arranged parallel to the vehicle width direction and the retarder 36 is arranged on the pinion shaft 20, dimensions of the electric drive unit 130 in the vehicle front-rear direction can be reduced. Furthermore, in the present embodiment, the paralleled gears such as helical gears are used as the ring gear 146 and the drive pinion 144 of the differential device 30, so that the transmission efficiency is improved as compared with the hypoid gears.

FIG. 20 is a diagram illustrating an example of the second mode, and is a skeleton diagram of an electric drive unit, which corresponds to FIG. 2. An electric drive unit 200 in FIG. 20 is mounted on the electric vehicle 8 instead of the electric drive unit 10. In the electric drive unit 200, a first rotating machine 202 and a second rotating machine 204 are disposed on the first axis S1 and the fourth axis S4, respectively, both are parallel to the vehicle width direction, and a pinion shaft 206 is disposed on the second axis S2 that is parallel to the vehicle width direction. Both the first rotating machine 202 and the second rotating machine 204 are motor generators. The first axis S1, the second axis S2, and the fourth axis S4 are all defined forward of the third axis S3, which is the axis of the differential device 30, in the vehicle front-rear direction. The first rotating machine 202, the second rotating machine 204, the pinion shaft 206 are all arranged forward of the third axis S3 in the vehicle front-rear direction. The first axis Si coincides with an axis of the first rotating machine 202, the fourth axis S4 coincides with an axis of the second rotating machine 204, and the second axis S2 coincides with an axis of the pinion shaft 206.

The first axis S1 and the fourth axis S4 are defined apart from each other in the vehicle front-rear direction or the vehicle height direction, and an output shaft 210 of the first rotating machine 202 and an output shaft 212 of the second rotating machine 204 are connected to the pinion shaft 206 via a gear-type speed reduction mechanism 214. The gear-type speed reduction mechanism 214 includes small-diameter gears 216, 218 provided on the output shafts 210, 212 and having the same number of teeth, and a large-diameter gear 220 provided on the pinion shaft 206 and meshed with the small-diameter gears 216, 218. The rotations transmitted from the output shafts 210, 212 are decelerated in accordance with a gear ratio of the gears and transmitted to the pinion shaft 206. The small-diameter gears 216, 218 having different numbers of teeth may be used. A drive pinion 222 is provided on the pinion shaft 206 and meshes with a ring gear 224 of the differential device 30. The drive pinion 222 and the ring gear 224 are paralleled gears such as helical gears etc. In the present embodiment, a transaxle 226 includes the gear-type speed reduction mechanism 214, the pinion shaft 206, and the differential device 30, and the electric drive unit 200 is for a propeller-less electric vehicle with no propeller shaft. The second axis S2 may be defined upward in the vehicle height direction or rearward in the vehicle front-rear direction with respect to the third axis S3. The positions of the first axis S1 and the fourth axis S4 are defined as appropriate in accordance with the position of the second axis S2.

The pinion shaft 206 functions as a combined power transmission shaft to which powers output from the first rotating machine 202 and the second rotating machine 204 are transmitted, and the retarder 36 is attached to the pinion shaft 206. That is, a first end portion, that is, a left end portion of the pinion shaft 206 in the vehicle width direction, which is on the lower side of FIG. 20, is provided so as to protrude outward from the case 16, and the retarder 36 is attached to the protruding end portion, as in FIG. 3. The second axis S2 coincides with the axis of the retarder 36.

As described above, in the electric drive unit 200 of the present embodiment, the pinion shaft 206, to which the powers output from the first rotating machine 202 and the second rotating machine 204 are transmitted, is disposed on the second axis S2 that is different from the axes of the first rotating machine 202 and the second rotating machine 204. The retarder 36 is attached to the pinion shaft 206. The pinion shaft 206 originally has high strength and rigidity because power and regenerative braking force are transmitted from the first rotating machine 202 and the second rotating machine 204. Thus, the retarder 36 can be attached to the pinion shaft 206 without any special reinforcement or the like, and a single retarder 36 can generate a predetermined braking force. Accordingly, it is possible to eliminate the propeller shaft and to integrally assemble the first rotating machine 202, the second rotating machine 204, the gear-type speed reduction mechanism 29, the retarder 36, and the differential device 30 to the case 16. This makes the electric drive unit 200 compact, which is advantageous in terms of space.

That is, when the retarder 36 is arranged on one of the output shafts 210, 212 of the first and second rotating machines 202, 204 so as to obtain a predetermined braking force, it is necessary to reinforce the output shaft 210 or 212, the small-diameter gear 216 or 218, etc., and thus downsizing of the electric drive unit 200 is inhibited. If the retarder 36 is provided on both the output shafts 210 and 212 of the first rotating machine 202 and the second rotating machine 204, a required braking force of each of the retarders 36 is reduced and the reinforcement is not required. However, the total arrangement space for the two retarders 36 is large, which also inhibits the downsizing of the electric drive unit 200.

Moreover, the first rotating machine 202, the second rotating machine 204, and the pinion shaft 206 are all arranged parallel to the vehicle width direction and the retarder 36 is provided on the pinion shaft 206. Therefore, dimensions of the electric drive unit 200 in the vehicle front-rear direction can be reduced, and thus, the electric drive unit 200 can be made more compact. Moreover, the paralleled gears such as helical gears are used as the ring gear 224 and the drive pinion 222 of the differential device 30, so that the transmission efficiency is improved as compared with the hypoid gears.

Furthermore, in the present embodiment, the first and second rotating machines 202, 204 and the retarder 36 are arranged at opposite ends in the vehicle width direction. This improves the weight balance of the electric drive unit 200 in the vehicle width direction, which is advantageous in strength and enables weight reduction and downsizing of the electric drive unit 200. However, the retarder 36 can also be disposed at the right end in the vehicle width direction, like the first rotating machine 202 and the second rotating machine 204.

Figure 21:
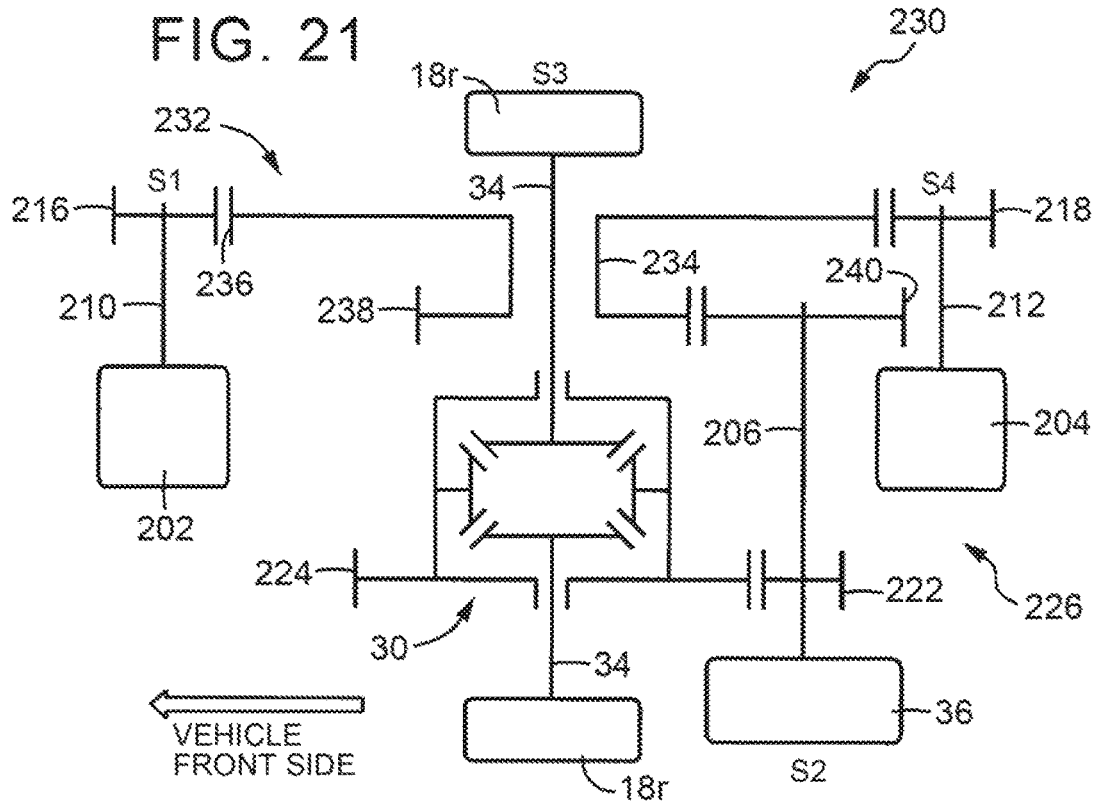
FIG. 21 is a diagram illustrating another embodiment of the second mode, and is a skeleton diagram corresponding to FIG. 20, in which the case is omitted.
Figure 22:
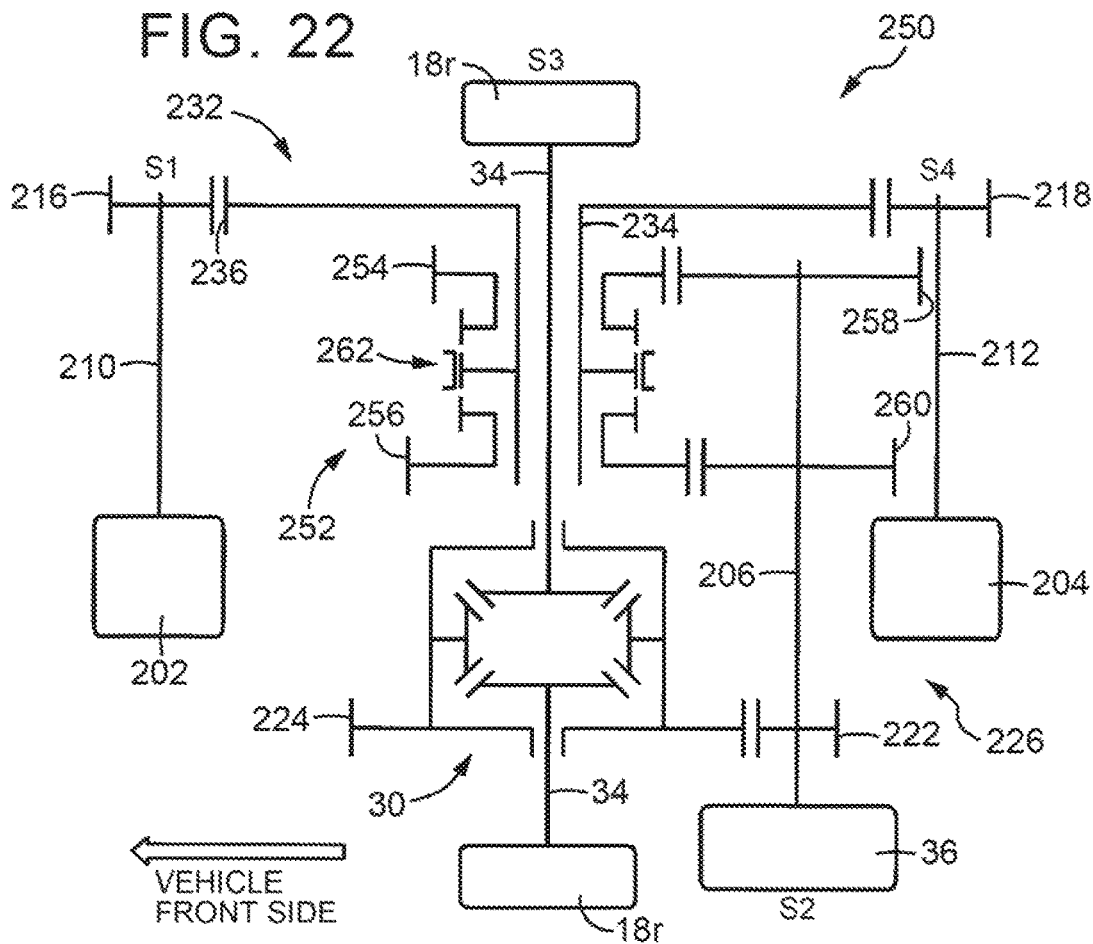
FIG. 22 is a diagram illustrating yet another embodiment of the second mode, and is a skeleton diagram corresponding to FIG. 20, in which the case is omitted.
Figure 23:
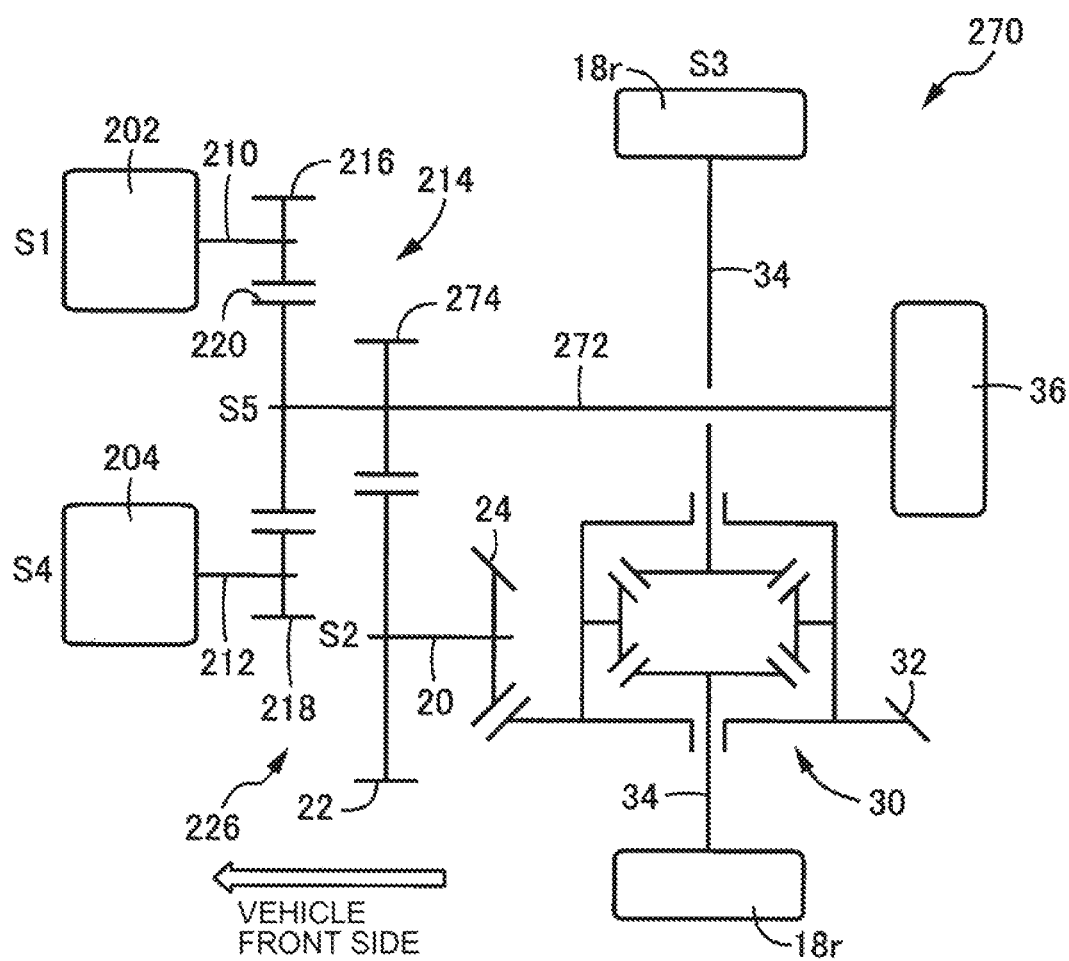
FIG. 23 is a diagram illustrating yet another embodiment of the second mode, and is a skeleton diagram corresponding to FIG. 20, in which the case is omitted.

FIGS. 21 to 23 are diagrams illustrating other embodiments of the second mode, and are skeleton diagrams of the electric drive unit, which correspond to FIG. 20 and in which the case 16 is omitted. In an electric drive unit 230 in FIG. 21, the first rotating machine 202 and the second rotating machine 204 are both arranged reversely in the vehicle width direction (reversely in the vertical direction in FIG. 21), compared with the electric drive unit 200, and the second rotating machine 204 and the retarder 36 are arranged rearward of the third axis S3 in the vehicle front-rear direction. The rotations of the first rotating machine 202 and the second rotating machine 204 are transmitted to the pinion shaft 206 via a gear-type speed reduction mechanism 232. The gear-type speed reduction mechanism 232 includes a hollow intermediate shaft 234 that is rotatably arranged around the third axis S3 so as to be rotatable relative to the right drive shaft 34. The intermediate shaft 234 is provided with a large-diameter gear 236 and a small-diameter gear 238 for speed reduction. The large-diameter gear 236 is meshed with the small-diameter gears 216 and 218 provided on the output shafts 210 and 212, and the small-diameter gear 238 is meshed with a driven gear 240 provided on the pinion shaft 206. The rotations transmitted from the output shafts 210, 212 are decelerated in accordance with gear ratios (ratios of the number of teeth) between the gears and transmitted to the pinion shaft 206.

Also in the electric drive unit 230, the same effects as those of the electric drive unit 200 can be obtained. In addition, the first rotating machine 202 is arranged on the opposite side of the third axis S3, which is the axis of the differential device 30, from the second rotating machine 204 and the retarder 36 in the vehicle front-rear direction, in a plan view seen from above the vehicle. This improves a weight balance of the electric drive unit 230 between the parts forward and rearward of the third axis S3, which is the axis of the differential device 30, in the vehicle front-rear direction. This is advantageous in strength and enables weight reduction and downsizing of the electric drive unit 230. That is, the electric drive unit 230 is also an embodiment of the first mode.

The first axis S1 that is the axis of the first rotating machine 202, the fourth axis S4 that is the axis of the second rotating machine 204, and the second axis S2 that is the axis of the pinion shaft 206 to which the retarder 36 is attached may be defined at any positions around the third axis S3. For example, the second axis S2 may be defined upward of the third axis S3 in the vehicle height direction.

An electric drive unit 250 in FIG. 22 is different from the electric drive unit 230 in that a two-stage parallel-axis transmission 252 is provided between the intermediate shaft 234 and the pinion shaft 206. The parallel-axis transmission 252 includes a pair of speed change drive gears 254, 256, a pair of speed change driven gears 258, 260, and a meshing clutch mechanism 262. The speed change drive gears 254, 256 are rotatably disposed around the third axis S3 so as to be rotatable relative to the intermediate shaft 234. The speed change driven gears 258, 260 are disposed on the pinion shaft 206 so as to mesh with the speed change drive gears 254, 256. The meshing clutch mechanism 262 has a synchromesh mechanism and selectively connects the speed change drive gears 254, 256 to the intermediate shaft 234. When the speed change drive gear 254 is connected to the intermediate shaft 234, the low gear stage with the large gear ratio is established. When the speed change drive gear 256 is connected to the intermediate shaft 234, the high gear stage with the small gear ratio is established. When neither of the speed change drive gears 254, 256 is connected to intermediate shaft 234, a neutral state is established in which the rotating machines 202 and 204 are separated from the power transmission path. Instead of the meshing clutch mechanism 262, a single-plate or multiple-plate friction engagement clutch may be used.

In the present embodiment, the electric drive unit 250 can switch torques transmitted from the rotating machines 202, 204 in two stages, i.e., between high and low, with the parallel-axis transmission 252 in accordance with the running load, the required output, etc. to transmit the torque to the pinion shaft 206. Therefore, the driving force performance and the drivability of the electric vehicle 8 are improved.

The electric drive unit 270 in FIG. 23 is different from the electric drive unit 200 of FIG. 20 in that the first axis S1 that is the axis of the first rotating machine 202 and the fourth axis S4 that is the axis of the second rotating machine 204 are defined to be perpendicular to the third axis S3 that is the axis of the differential device 30, that is, parallel to the vehicle front-rear direction, seen in a plan view. The first axis Si and the fourth axis S4 are defined to be separated from each other in the vehicle width direction or the vehicle height direction, and a fifth axis S5 is defined between the first axis Si and the fourth axis S4 so as to be parallel to the first axis Si and the fourth axis S4. An intermediate shaft 272 is disposed on the fifth axis S5 so as to be rotatable around the fifth axis S5. The fifth axis S5 coincides with the axis of the intermediate shaft 272. The output shaft 210 of the first rotating machine 202 and the output shaft 212 of the second rotating machine 204 are connected to the intermediate shaft 272 via the gear-type speed reduction mechanism 214.

The intermediate shaft 272 functions as the combined power transmission shaft to which powers output from the first rotating machine 202 and the second rotating machine 204 are transmitted, and the retarder 36 is attached to the intermediate shaft 272. The intermediate shaft 272 is provided so as to intersect the third axis S3 at a right angle in a plan view and extend in the vehicle front-rear direction. A front end portion of the intermediate shaft 272, which is located forward of the third axis S3 in the vehicle front-rear direction, is connected to the rotating machines 202, 204 via the gear-type speed reduction mechanism 214. A rear end portion of the intermediate shaft 272, which is located rearward of the third axis S3 in the vehicle front-rear direction is provided so as to protrude outward from the case 16, and the retarder 36 is attached to the protruding end portion. The fifth axis S5 coincides with the axis of the retarder 36. The intermediate shaft 272 is provided with a small-diameter gear 274, and the small-diameter gear 274 is meshed with the large-diameter gear 22 of the pinion shaft 20 disposed on the second axis S2. The second axis S2 is parallel to the first axis S1, the fourth axis S4, and the fifth axis S5, that is, parallel to the vehicle front-rear direction and adjacent to the fifth axis S5 on which the intermediate shaft 272 is disposed in the vehicle width direction. The retarder 36 may be arranged, together with the first rotating machine 202 and the second rotating machine 204, forward of the third axis S3, which is the axis of the differential device 30, in the vehicle front-rear direction.

Also in the electric drive unit 270, the same effects as those of the electric drive unit 200 can be obtained. In addition, the first and second rotating machines 202, 204 and the retarder 36 are arranged on the opposite sides of the third axis S3, which is the axis of the differential device 30, in the vehicle front-rear direction, in a plan view seen from above the vehicle. This improves a weight balance of the electric drive unit 270 between the parts forward and rearward of the third axis S3, which is the axis of the differential device 30, in the vehicle front-rear direction. This is advantageous in strength and enables weight reduction and downsizing of the electric drive unit 270. That is, the electric drive unit 270 is also an embodiment of the first mode. Moreover, since both the first rotating machine 202, the second rotating machine 204, and the retarder 36 are arranged parallel to the vehicle front-rear direction, dimensions of the electric drive unit 270 in the vehicle width direction can be reduced.

Although the embodiments of the disclosure have been described in detail with reference to the drawings, these are only exemplary, and various modifications and improvements may be made based on the knowledge of those skilled in the art to carry out the disclosure.

What is claimed is:

1. An electric drive device for a vehicle, the electric drive device comprising:
   a rotating machine that is used as a driving force source for traveling of the vehicle;
   a differential device configured to distribute power transmitted from the rotating machine to right and left driving wheels; and
   a retarder provided in a power transmission path between the rotating machine and the differential device and configured to generate a braking force, the retarder being either an electromagnetic retarder or a fluid retarder, wherein
   the rotating machine and the retarder are arranged on opposite sides of an axis of the differential device in a front-rear direction of the vehicle in a plan view seen from above the vehicle, the axis of the differential device being parallel to a width direction of the vehicle.

2. The electric drive device according to claim 1, wherein the rotating machine and the retarder are arranged such that both an axis of the rotating machine and an axis of the retarder are parallel to the front-rear direction of the vehicle in the plan view.

3. An electric drive device for a vehicle, the electric drive device comprising:
   a rotating machine that is used as a driving force source for traveling of the vehicle;
   a differential device configured to distribute power transmitted from the rotating machine to right and left driving wheels; and
   a retarder provided in a power transmission path between the rotating machine and the differential device and configured to generate a braking force, the retarder being either an electromagnetic retarder or a fluid retarder, wherein
   the rotating machine includes a first rotating machine and a second rotating machine arranged on different axes,
   the power transmission path between the first rotating machine and the second rotating machine and the differential device is provided with a combined power transmission shaft to which power output from the first rotating machine and power output from the second rotating machine are transmitted, the combined power transmission shaft being provided on an axis different from an axis of the first rotating machine and an axis of the second rotating machine, and
   the retarder is provided on the combined power transmission shaft.

4. The electric drive device according to claim 3, wherein:
   the first rotating machine, the second rotating machine, and the combined power transmission shaft are arranged such that the axis of the first rotating machine, the axis of the second rotating machine, and the axis of the combined power transmission shaft are all arranged parallel to a width direction of the vehicle; and
   the combined power transmission shaft on which the retarder is provided is a pinion shaft provided with a drive pinion that meshes with a ring gear of the differential device.

5. The electric drive device according to claim 3, wherein the first rotating machine, the second rotating machine, and the retarder are arranged on opposite sides of an axis of the differential device in a front-rear direction of the vehicle in a plan view seen from above the vehicle, the axis of the differential device being parallel to a width direction of the vehicle.

* * * * *